(12) United States Patent
Yamamoto et al.

(10) Patent No.: US 10,186,732 B2
(45) Date of Patent: Jan. 22, 2019

(54) NONAQUEOUS ELECTROLYTE SOLUTION FOR BATTERIES, AND NONAQUEOUS ELECTROLYTE SECONDARY BATTERY USING SAME

(75) Inventors: Kouhei Yamamoto, Aichi (JP); Hisashi Umemoto, Aichi (JP); Kyohei Usami, Aichi (JP); Manabu Yamada, Aichi (JP); Takayuki Taki, Tokyo (JP); Yuyu Ohnuma, Tokyo (JP); Hiroaki Watanabe, Tokyo (JP); Atsuski Shibuya, Tokyo (JP)

(73) Assignees: DENSO CORPORATION, Aichi (JP); ADEKA CORPORATION, Tokyo (JP)

( * ) Notice: Subject to any disclaimer, the term of this patent is extended or adjusted under 35 U.S.C. 154(b) by 516 days.

(21) Appl. No.: 13/983,599

(22) PCT Filed: Mar. 4, 2011

(86) PCT No.: PCT/JP2011/055094
§ 371 (c)(1),
(2), (4) Date: Aug. 5, 2013

(87) PCT Pub. No.: WO2012/120597
PCT Pub. Date: Sep. 13, 2012

(65) Prior Publication Data
US 2013/0323605 A1 Dec. 5, 2013

(51) Int. Cl.
*H01M 10/0569* (2010.01)
*H01M 10/0567* (2010.01)
(Continued)

(52) U.S. Cl.
CPC ......... *H01M 10/0567* (2013.01); *H01M 4/36* (2013.01); *H01M 4/587* (2013.01);
(Continued)

(58) Field of Classification Search
CPC .. H01M 4/621; H01M 4/622; H01M 10/0567; H01M 10/0568; H01M 10/0569;
(Continued)

(56) References Cited

U.S. PATENT DOCUMENTS

| 5,626,981 A | 5/1997 | Simon et al. |
| 6,203,942 B1 | 3/2001 | Gan et al. |

(Continued)

FOREIGN PATENT DOCUMENTS

| EP | 2613395 | 7/2013 |
| EP | 2642579 | 9/2013 |

(Continued)

OTHER PUBLICATIONS

Mandal, Braja K. et al., "Thermal runaway inhibitors for lithium battery electrolytes", Journal of Power Sources, vol. 161, No. 2, pp. 1341-1345, 2006.

(Continued)

*Primary Examiner* — Ula C Ruddock
*Assistant Examiner* — Matthew W Van Oudenaren
(74) *Attorney, Agent, or Firm* — Young & Thompson

(57) ABSTRACT

A nonaqueous electrolyte solution for secondary batteries, which maintains small internal resistance and high electrical capacitance in long-term use in a nonaqueous electrolyte secondary battery uses, as an active material, a crystalline carbon material having a high crystallinity, and a negative electrode produced using a polymeric carboxylic compound as a binding agent. The nonaqueous electrolyte solution contains: (A) at least one compound selected from a group consisting of an unsaturated phosphate ester compound represented by a general formula (1) and an unsaturated phosphate ester compound represented by a general formula (2); (B) at least one compound selected from a group consisting of a sulfite ester compound, a sulfonate ester (Continued)

compound, an alkali metal imide salt compound, a fluorosilane compound, an organic disilane compound or an organic disiloxane compound; (C) an organic solvent, and (D) an electrolyte salt. A secondary battery using such nonaqueous electrolyte solution is also described.

13 Claims, 1 Drawing Sheet

(51) Int. Cl.
  *H01M 10/0568*    (2010.01)
  *H01M 4/36*    (2006.01)
  *H01M 4/62*    (2006.01)
  *H01M 4/587*    (2010.01)
  *H01M 10/0525*    (2010.01)
  *H01M 10/0566*    (2010.01)

(52) U.S. Cl.
  CPC ....... *H01M 4/622* (2013.01); *H01M 10/0525* (2013.01); *H01M 10/0568* (2013.01); *H01M 10/0569* (2013.01); *H01M 10/0566* (2013.01); *Y02T 10/7011* (2013.01)

(58) Field of Classification Search
  CPC ......... H01M 10/0525; H01M 10/0566; H01M 4/36; H01M 4/587
  See application file for complete search history.

(56) References Cited

U.S. PATENT DOCUMENTS

| | | | | |
|---|---|---|---|---|
| 6,872,493 | B2* | 3/2005 | Yamada | H01M 10/052 429/313 |
| 2003/0027046 | A1* | 2/2003 | Hosokawa | H01M 4/131 429/223 |
| 2003/0077517 | A1* | 4/2003 | Nakanishi | H01M 4/131 429/324 |
| 2003/0113635 | A1* | 6/2003 | Gan | H01M 4/485 429/326 |
| 2004/0043293 | A1* | 3/2004 | Nagata | H01M 4/583 429/231.8 |
| 2005/0100795 | A1* | 5/2005 | Utsugi | H01M 10/0567 429/326 |
| 2006/0269843 | A1* | 11/2006 | Usami | H01M 10/0567 429/324 |
| 2006/0292452 | A1* | 12/2006 | Utsugi | C07C 309/07 429/340 |
| 2008/0057402 | A1* | 3/2008 | Abe | H01M 6/168 429/333 |
| 2008/0118835 | A1* | 5/2008 | Hur | H01M 4/131 429/219 |
| 2010/0015514 | A1 | 1/2010 | Miyagi et al. | |
| 2010/0099031 | A1 | 4/2010 | Kato et al. | |

FOREIGN PATENT DOCUMENTS

| | | |
|---|---|---|
| JP | 63-102173 | 5/1988 |
| JP | 04-087156 | 3/1992 |
| JP | 05-074486 | 3/1993 |
| JP | 10-050342 | 2/1998 |
| JP | 2000-331710 | 11/2000 |
| JP | 2001-006729 | 1/2001 |
| JP | 2002-198092 | 7/2002 |
| JP | 2007-115671 | 5/2007 |
| JP | 2007-220670 | 8/2007 |
| JP | 2008-041635 | 2/2008 |
| JP | 2008-277001 | 11/2008 |
| JP | 2010-272376 | 12/2010 |
| JP | 2011-077029 | 4/2011 |
| WO | WO2010084906 | * 7/2010 |

OTHER PUBLICATIONS

International Search Report PCT/JP2011/055094 dated May 24, 2011, with English translation.

* cited by examiner

[Fig.1]
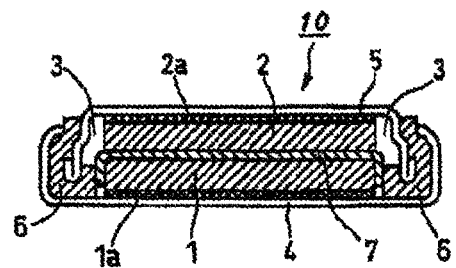
[Fig.2]
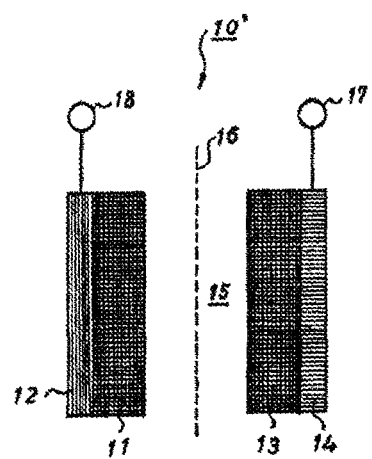
[Fig.3]
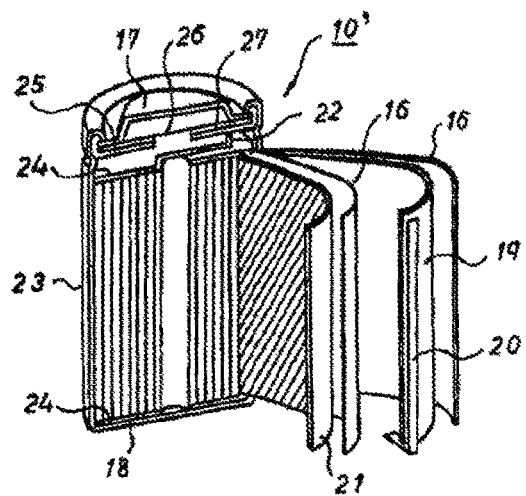

NONAQUEOUS ELECTROLYTE SOLUTION FOR BATTERIES, AND NONAQUEOUS ELECTROLYTE SECONDARY BATTERY USING SAME

TECHNICAL FIELD

The present invention relates to a nonaqueous electrolyte solution for batteries and a nonaqueous electrolyte secondary battery using the electrolyte solution.

BACKGROUND ART

Along with the recent spread of portable electronic devices such as a portable personal computer, a handy video camera, and an information terminal, a nonaqueous electrolyte secondary battery having a high voltage and a high energy density is widely used as a power supply. Battery cars and hybrid cars in which electric power is used in a part of the motive power have been put into practical use in terms of environmental problems.

Negative and positive electrodes of the nonaqueous electrolyte secondary battery are produced by coating, on a metal collector, a slurry or pasty coating liquid, produced by mixing an electrode active material, an electroconductive material, a binder (binding agent) and a solvent. As such a solvent used in the positive or negative electrode, an organic solvent such as dimethylacetamide, acetone, dimethylformamide, and N-methylpyrrolidone or water is used; however, since the organic solvent imposes high load on the environment, water is often used as the solvent in recent years.

As a binder or a thickener used when a solvent is water, there is used a polymeric carboxylic compound such as polyacrylic acid and carboxymethylcellulose; polyvinyl alcohol, polyethyleneglycol, carboxymethylcellulose, polyvinylpyrrolidone, polyacrylic acid amide, or the like.

When the polymeric carboxylic compound is used, there has been known that a carboxyl group thereof is adsorbed to a surface of a metal collector, an electrode active material, an electroconductive material, or the like, whereby a good electrode excellent in binding properties can be obtained (for example, see Patent Literature 1).

However, in a nonaqueous electrolyte secondary battery having a negative electrode using a polymeric carboxylic compound, there is a problem that an irreversible capacity is easily increased at the time of initial charging, and there is a problem that the electrical capacitance is easily reduced or an internal resistance is easily increased by storage at high temperature or repetition of discharge and charge at high temperature. Such a problem often occurs particularly in a nonaqueous electrolyte secondary battery having a negative electrode containing a polymeric carboxylic compound and a crystalline carbon material such as graphite.

It is considered that this is because the polymeric carboxylic compound is decomposed at an active site on the negative electrode, and particularly an end surface of a highly reactive crystalline carbon material, and a current is consumed at this time, whereby an irreversible capacity is generated at the time of initial charge. The decomposition product in a high temperature state further reacts with an electrolyte or the like, whereby the irreversible capacity is increased, and, at the same time, a large amount of decomposition products is accumulated to cause inhibition of movement of lithium ions on a negative electrode surface. When the positive electrode is one containing a nickel compound or an iron compound as an active material, the extent of such inhibition may be further increased.

Meanwhile, in the nonaqueous electrolyte secondary battery, various additives for nonaqueous electrolyte solutions are proposed to enhance the stability and the electrical characteristics, and additives such as 1,3-propanesultone (for example, see Patent Literature 2), vinyl ethylene carbonate (for example, see Patent Literature 3), vinylene carbonate (for example, see Patent Literature 4), 1,3-propanesultone, butanesultone (for example, see Patent Literature 5), vinylene carbonate (for example, see Patent Literature 6), and vinyl ethylene carbonate (for example, see Patent Literature 7) form a stable coat called SEI (Solid Electrolyte Interface) on a surface of a negative electrode, and it is considered that reductive decomposition of the nonaqueous electrolyte solution is suppressed by coating the negative electrode surface with the coat. Among those additives, vinylene carbonate is widely used because it is considerably effective.

However, although the above additives exhibit a certain effect in reduction of the irreversible capacity at the time of initial charge in a negative electrode containing a polymeric carboxylic compound, it cannot be said that the effect is sufficient. Since the above additives in a high temperature state has a high reactivity with a decomposition product of the polymeric carboxylic compound and forms a thick coat, a sufficient protective effect against a reduction of the electrical capacitance and an increase of the internal resistance caused by storage at high temperature or repetition of discharge and charge at high temperature cannot be obtained.

Although the polymeric carboxylic compound is sometimes used by being neutralized or partially neutralized with amines or alkali metal in order to enhance the water solubility and regulate pH, the polymeric carboxylic compound in this invention includes such neutralized product and partially neutralized product of the polymeric carboxylic compound.

CITATION LIST

Patent Literatures

Patent Literature 1: JP 2007-115671 A
Patent Literature 2: JP 63-102173 A
Patent Literature 3: JP 4-87156 A
Patent Literature 4: JP 5-74486 A
Patent Literature 5: JP10-50342 A
Patent Literature 6: U.S. Pat. No. 5,626,981
Patent Literature 7: JP 2001-6729 A

SUMMARY OF INVENTION

Technical Problem

Accordingly, this invention provides a nonaqueous electrolyte solution for secondary batteries, which can maintain a small internal resistance and a high electrical capacitance in long-term use in a nonaqueous electrolyte secondary battery using, as an active material, a crystalline carbon material having a high crystallinity, such as graphite and a negative electrode produced using a polymeric carboxylic compound as a binding agent, and a nonaqueous electrolyte secondary battery using the nonaqueous electrolyte solution for secondary batteries.

Solution to Problem

As a result of intensive studies made by the present inventors, the present inventors have found that the above problem can be solved by using an electrolyte solution containing at least one compound selected from a group consisting of an unsaturated phosphate ester compound having a specific structure and at least one compound selected from a group consisting of a sulfite ester compound, a sulfonate ester compound, an alkali metal imide salt compound, a fluorosilane compound, and an organic disilane compound, or an organic disiloxane compound, and the present inventors have completed the present invention.

Namely, the present invention provides a nonaqueous electrolyte solution for batteries containing, as an (A) component, at least one compound selected from a group consisting of an unsaturated phosphate ester compound represented by the following general formula (1) and an unsaturated phosphate ester compound represented by the following general formula (2), as a (B) component, at least one compound selected from a group consisting of the sulfite ester compound, the sulfonate ester compound, the alkali metal imide salt compound, the fluorosilane compound, and the organic disilane compound, or the organic disiloxane compound, an organic solvent as a (C) component, and electrolyte salt as a (D) component.

[Chemical Formula 1]

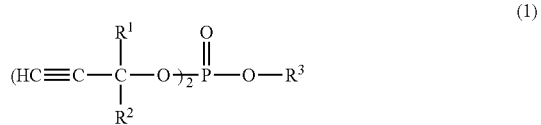

wherein $R^1$ and $R^2$ each independently represents a hydrogen atom or an alkyl group having a carbon number of 1 to 8, and $R^3$ represents an alkyl group having a carbon number of 1 to 8, an alkenyl group having a carbon number of 2 to 8, an alkynyl group having a carbon number of 2 to 8, or a haloalkyl group having a carbon number of 1 to 8.

[Chemical Formula 2]

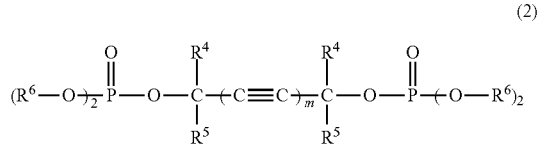

wherein $R^4$ and $R^5$ each independently represents a hydrogen atom or an alkyl group having a carbon number of 1 to 8, $R^6$ represents an alkyl group having a carbon number of 1 to 8, an alkenyl group having a carbon number of 2 to 8, an alkynyl group having a carbon number of 2 to 8, or a haloalkyl group having a carbon number of 1 to 8, and m represents 1 or 2.

The present invention further provides a nonaqueous electrolyte secondary battery having a negative electrode, a positive electrode, and the above nonaqueous electrolyte solution for batteries, preferably a nonaqueous electrolyte secondary battery having a negative electrode containing a polymeric carboxylic compound, a positive electrode containing a nickel compound or an iron compound as a positive electrode active material, and nonaqueous electrolyte secondary batteries having the above nonaqueous electrolyte solution for batteries.

Advantageous Effects of Invention

According to this invention, a life of a nonaqueous electrolyte secondary battery can be significantly extended, and particularly in a nonaqueous electrolyte secondary battery using a negative electrode containing a polymeric carboxylic compound and a crystalline carbon material, a small internal resistance and a high electrical capacitance can be maintained in long-term use.

BRIEF DESCRIPTION OF DRAWINGS

FIG. 1 is a longitudinal cross-sectional view schematically showing an example of a structure of a coin type battery of a nonaqueous electrolyte secondary battery of the present invention.

FIG. 2 is a schematic diagram showing a basic constitution of a cylindrical battery of the nonaqueous electrolyte secondary battery of the invention FIG. 3 is a perspective view showing a cross section of an inner structure of the cylindrical battery of the nonaqueous electrolyte secondary battery of the invention.

DESCRIPTION OF EMBODIMENTS

Hereinafter, the present invention will be described in detail based on preferred embodiments. First, a nonaqueous electrolyte solution for batteries of the invention will be described.

The nonaqueous electrolyte solution for batteries of the invention contains, as an (A) component, at least one compound selected from a group consisting of an unsaturated phosphate ester compound represented by the general formula (1) and an unsaturated phosphate ester compound represented by the general formula (2), as a (B) component, at least one compound selected from a group consisting of a sulfite ester compound, a sulfonate ester compound, an alkali metal imide salt compound, a fluorosilane compound, and an organic disilane compound, or an organic disiloxane compound, an organic solvent as a (C) component, and electrolyte salt as a (D) component.

<(A) Component>

The nonaqueous electrolyte solution for batteries of the present invention contains, as the (A) component, at least one compound selected from a group consisting of an unsaturated phosphate ester compound represented by the general formula (1) and an unsaturated phosphate ester compound represented by the general formula (2). First, the unsaturated phosphate ester compound represented by the general formula (1) will be described.

In the general formula (1), $R^1$ and $R^2$ each independently represents a hydrogen atom or an alkyl group having a carbon number of 1 to 8. The alkyl group having a carbon number of 1 to 8 includes, for example, methyl, ethyl, propyl, isopropyl, butyl, isobutyl, secondary butyl, t-butyl, pentyl, isopentyl, secondary pentyl, t-pentyl, hexyl, secondary hexyl, heptyl, secondary heptyl, octyl, secondary octyl, 2-methyl pentyl, and 2-ethylhexyl. As $R^1$ and $R^2$, hydrogen atoms, methyl, ethyl, and propyl are preferably used in terms of less adverse effect on movement of lithium ions and good charging properties, more preferably hydrogen atoms and methyl, even more preferably hydrogen atoms.

$R^3$ represents an alkyl group having a carbon number of 1 to 8, an alkenyl group having a carbon number of 2 to 8, an alkynyl group having a carbon number of 2 to 8, or a haloalkyl group having a carbon number of 1 to 8. The alkyl group having a carbon number of 1 to 8 includes, for example, the alkyl group exemplified in the descriptions of $R^1$ and $R^2$. The alkenyl group having a carbon number of 2 to 8 includes, for example, vinyl, allyl, 3-butenyl, isobutenyl, 4-pentenyl, 5-hexenyl, 6-heptenyl, and 7-octenyl. The alkynyl group having a carbon number of 2 to 8 includes, for example, ethynyl, 2-propynyl (also referred to as propargyl), 3-butynyl, 1-methyl-2-propynyl, and 1,1-dimethyl-2-propynyl. The haloalkyl group having a carbon number of 1 to 8 includes, for example, chloromethyl, trifluoromethyl, 2-fluoroethyl, 2-chloroethyl, 2,2,2-trifluoroethyl, 2,2,2-trichloroethyl, 1,1,2,2-tetrafluoroethyl, pentafluoroethyl, 3-fluoropropyl, 2-chloropropyl, 3-chloropropyl, 2-chloro-2-propyl, 3,3,3-trifluoropropyl, 2,2,3,3-tetrafluoropropyl, heptafluoropropyl, 2-chlorobutyl, 3-chlorobutyl, 4-chlorobutyl, 3-chloro-2-butyl, 1-chloro-2-butyl, 2-chloro-1,1-dimethylethyl, 3-chloro-2-methylpropyl, 5-chloropentyl, 3-chloro-2-methylpropyl, 3-chloro-2,2-dimethyl, and 6-chlorohexyl. $R^3$ is preferably methyl, ethyl, propyl, isopropyl, butyl, pentyl, 2-propynyl, 3-chloropropyl, 3-chlorobutyl, or 4-chlorobutyl from viewpoint of reduction of the internal resistance of the nonaqueous electrolyte secondary battery, more preferably, methyl ethyl, propyl, and 2-propynyl, even more preferably ethyl and 2-propynyl.

Among the unsaturated phosphate ester compounds represented by the general formula (1), compounds in which $R^1$ and $R^2$ are hydrogen atoms include, for example, methylbis(2-propynyl)phosphate, ethylbis(2-propynyl)phosphate, propylbis(2-propynyl)phosphate, butylbis(2-propynyl)phosphate, pentylbis(2-propynyl)phosphate, allylbis(2-propynyl)phosphate, tris(2-propynyl)phosphate, 2-chloroethylbis(2-propynyl)phosphate, 2,2,2-trifluoroethylbis(2-propynyl)phosphate, and 2,2,2-trichloroethylbis(2-propynyl)phosphate.

Compounds in which $R^1$ represents methyl and $R^2$ represents a hydrogen atom include, for example, methylbis(1-methyl-2-propynyl)phosphate, ethylbis(1-methyl-2-propynyl)phosphate, propylbis(1-methyl-2-propynyl)phosphate, butylbis(1-methyl-2-propynyl)phosphate, pentylbis(1-methyl-2-propynyl)phosphate, allylbis(1-methyl-2-propynyl)phosphate, 2-propynylbis(1-methyl-2-propynyl)phosphate, tris(1-methyl-1-methyl-2-propynyl)phosphate, 2-chloroethylbis(1-methyl-2-propynyl)phosphate, 2,2,2-trifluoroethylbis(1-methyl-2-propynyl)phosphate, and 2,2,2-trichloroethylbis(1-methyl-2-propynyl)phosphate.

Among the unsaturated phosphate ester compounds represented by the general formula (1), compounds in which $R^1$ and $R^2$ are each methyl include, for example, methylbis(1,1-dimethyl-2-propynyl)phosphate, ethylbis(1,1-dimethyl-2-propynyl)phosphate, propylbis(1,1-dimethyl-2-propynyl)phosphate, butylbis(1,1-dimethyl-2-propynyl)phosphate, pentylbis(1,1-dimethyl-2-propynyl)phosphate, allylbis(1,1-dimethyl-2-propynyl)phosphate, 2-propynylbis(1,1-dimethyl-2-propynyl)phosphate, tris(1,1-dimethyl-2-propynyl)phosphate, 2-chloroethylbis(1,1-dimethyl-2-propynyl)phosphate, 2,2,2-trifluoroethylbis(1,1-dimethyl-2-propynyl)phosphate, and 2,2,2-trichloroethylbis(1,1-dimethyl-2-propynyl)phosphate.

The unsaturated phosphate ester compounds represented by the general formula (1) is preferably methylbis(2-propynyl)phosphate, ethylbis(2-propynyl)phosphate, propylbis(2-propynyl)phosphate, butylbis(2-propynyl)phosphate, pentylbis(2-propynyl)phosphate, tris(2-propynyl)phosphate, and 2-chloroethylbis(2-propynyl)phosphate, more preferably ethylbis(2-propynyl)phosphate, propylbis(2-propynyl)phosphate, butylbis(2-propynyl)phosphate, and tris(2-propynyl)phosphate, even more preferably ethylbis(2-propynyl)phosphate and tris(2-propynyl)phosphate. The unsaturated phosphate ester compound represented by the general formula (1) may be used alone, or two or more kinds of the unsaturated phosphate ester compounds may be used in combination.

In the nonaqueous electrolyte solution for batteries of the present invention, when the content of the unsaturated phosphate ester compounds represented by the general formula (1) is too small, a sufficient effect cannot be exercised, and when the content of the unsaturated phosphate ester compounds is too large, an extending effect matching the blending quantity cannot be obtained, and, to make matters worse, this may adversely impact the characteristics of the nonaqueous electrolyte solution for batteries. Accordingly, the content of the unsaturated phosphate ester compounds represented by the general formula (1) is preferably 0.001 to 5% by mass in the nonaqueous electrolyte solution for batteries, more preferably 0.01 to 4% by mass, even more preferably 0.03 to 3% by mass.

Next, the unsaturated phosphate ester compound represented by the general formula (2) will be described.

In the general formula (2), $R^4$ and $R^5$ each independently represents a hydrogen atom or an alkyl group having a carbon number of 1 to 8. The alkyl group having a carbon number of 1 to 8 includes, for example, methyl, ethyl, propyl, isopropyl, butyl, isobutyl, secondary butyl, t-butyl, pentyl, isopentyl, secondary pentyl, t-pentyl, hexyl, secondary hexyl, heptyl, secondary heptyl, octyl, secondary octyl, 2-methyl pentyl, and 2-ethylhexyl. $R^4$ and $R^5$ are preferably hydrogen atoms, methyl, ethyl, or propyl in terms of less adverse effect on movement of lithium ions and good charging properties, more preferably hydrogen atoms and methyl, even more preferably hydrogen atoms.

$R^6$ represents an alkyl group having a carbon number of 1 to 8, an alkenyl group having a carbon number of 2 to 8, an alkynyl group having a carbon number of 2 to 8, or a haloalkyl group having a carbon number of 1 to 8. The alkyl group having a carbon number of 1 to 8 includes the alkyl group exemplified in the descriptions of $R^4$ and $R^5$. The alkenyl group having a carbon number of 2 to 8 includes, for example, vinyl, allyl, 3-butenyl, isobutenyl, 4-pentenyl, 5-hexenyl, 6-heptenyl, and 7-octenyl. The alkynyl group having a carbon number of 2 to 8 includes, for example, ethynyl, 2-propynyl also (also referred to as propargyl), 3-butynyl, 1-methyl-2-propynyl, and 1,1-dimethyl-2-propynyl. The haloalkyl group having a carbon number of 1 to 8 includes, for example, chloromethyl, trifluoromethyl, 2-fluoromethyl, 2-chloroethyl, 2,2,2-trifluoroethyl, 2,2,2-trichloroethyl, 1,1,2,2-tetrafluoroethyl, pentafluoroethyl, 3-fluoropropyl, 2-chloropropyl, 3-chloropropyl, 2-chloro-2-propyl, 3,3,3-trifluoropropyl, 2,2,3,3-tetrafluoropropyl, heptafluoropropyl, 2-chlorobutyl, 3-chlorobutyl, 4-chlorobutyl, 3-chloro-2-butyl, 1-chloro-2-butyl, 2-chloro-1,1-dimethylethyl, 3-chloro-2-methylpropyl, 5-chloropentyl, 3-chloro-2-methylpropyl, 3-chloro-2,2-dimethyl, and 6-chlorohexyl. $R^6$ is preferably methyl, ethyl, propyl, isopropyl, butyl, pentyl, 2-propynyl, 3-chloropropyl, 3-chlorobutyl, or 4-chlorobutyl from viewpoint of reduction of the internal resistance of the nonaqueous electrolyte secondary battery, more preferably, methyl, ethyl, propyl, and 2-propynyl, even more preferably methyl and ethyl.

In the general formula (2), m represents 1 or 2. It is preferable that m is 2 because a phosphate ester reaction from alkyne diol which is a raw material is easy and the reactant is obtained in good yield.

Among the unsaturated phosphate ester compounds represented by the general formula (2), compounds in which m is 1 include, for example, 2-butyne-1,4-diol tetramethyl diphosphate, 2-butyne-1,4-diol tetraethyl diphosphate, 2-butyne-1,4-diol tetrapropyl diphosphate, 2-butyne-1,4-diol tetraisopropyl diphosphate, 2-butyne-1,4-diol tetrabutyl diphosphate, 2-butyne-1,4-diol tetrapentyl diphosphate, 2-butyne-1,4-diol tetrakis(2-propynyl)diphosphate, 2-butyne-1,4-diol tetrakis(3-chloropropyl)diphosphate, 2-butyne-1,4-diol tetrakis(3-chlorobutyl)diphosphate, and 2-butyne-1,4-diol tetrakis(4-chlorobutyl)diphosphate. Among those compounds, 2-butyne-1,4-diol tetramethyl diphosphate, 2-butyne-1,4-diol tetraethyl diphosphate, 2-butyne-1,4-diol tetrapropyl diphosphate, and 2-butyne-1,4-diol tetrakis(2-propynyl)diphosphate are preferred, more preferably 2-butyne-1,4-diol tetramethyl diphosphate and 2-butyne-1,4-diol tetrakis(2-propynyl)diphosphate.

Among the unsaturated phosphate ester compounds represented by the general formula (2), compounds in which in is 2 include, for example, 2,4-hexadiyne-1,6-diol tetramethyl diphosphate, 2,4-hexadiyne-1,6-diol tetraethyl diphosphate, 2,4-hexadiyne-1,6-diol tetrapropyl diphosphate, 2,4-hexadiyne-1,6-diol tetraisopropyl diphosphate, 2,4-hexadiyne-1,6-diol tetrabutyl diphosphate, 2,4-hexadiyne-1,6-diol tetrapentyl diphosphate, 2,4-hexadiyne-1,6-diol tetrakis(2-propynyl)diphosphate, 2,4-hexadiyne-1,6-diol tetrakis(3-chloropropyl)diphosphate, 2,4-hexadiyne-1,6-diol tetrakis(3-chlorobutyl)diphosphate, and 2,4-hexadiyne-1,6-diol tetrakis(4-chlorobutyl)diphosphate. Among those compounds, 2,4-hexadiyne-1,6-diol tetramethyl diphosphate, 2,4-hexadiyne-1,6-diol tetraethyl diphosphate, 2,4-hexadiyne-1,6-diol tetrapropyl diphosphate, and 2,4-hexadiyne-1,6-diol tetrakis(2-propynyl)diphosphate are preferred, more preferably 2,4-hexadiyne-1,6-diol tetramethyl diphosphate and 2,4-hexadiyne-1,6-diol tetrakis(2-propynyl) diphosphate. The unsaturated phosphate ester compound represented by the general formula (2) may be used alone, or two or more kinds of the unsaturated phosphate ester compound may be used in combination.

In the nonaqueous electrolyte solution for batteries of the present invention, when the content of the unsaturated phosphate ester compounds represented by the general formula (2) is too small, a sufficient effect cannot be exercised, and when the content of the unsaturated phosphate ester compounds is too large, the extending effect matching the blending quantity cannot be obtained, and, to make matters worse, this may adversely impact the characteristics of the nonaqueous electrolyte solution for batteries. Accordingly, the content of the unsaturated phosphate ester compounds represented by the general formula (2) is preferably 0.01 to 5% by mass in the nonaqueous electrolyte solution for batteries, more preferably 0.03 to 4% by mass, even more preferably 0.05 to 3% by mass.

As the (A) component of the present invention, the unsaturated phosphate ester compound represented by the general formula (1) is preferred for the sake of availability of industrial raw materials; however, when the unsaturated phosphate ester compound represented by the general formula (1) and the unsaturated phosphate ester compound represented by the general formula (2) are combined in use, the mass ratio of the unsaturated phosphate ester compound represented by the general formula (2) to the unsaturated phosphate ester compound represented by the general formula (1) is preferably 0.05 to 10, more preferably 0.1 to 5, even more preferably 0.2 to 3.

When the total content of the unsaturated phosphate ester compounds represented by the general formula (1) and the unsaturated phosphate ester compounds represented by the general formula (2) is too large, the extending effect matching the blending quantity cannot be obtained, and, to make matters worse, this may adversely impact the characteristics of the nonaqueous electrolyte solution for batteries. Thus, the total content is preferably not more than 5% by mass in the nonaqueous electrolyte solution for batteries, more preferably not more than 4% by mass, even more preferably not more than 3% by mass.

<(B) Component>

The nonaqueous electrolyte solution for batteries of the present invention contains, as the (B) component, at least one compound selected from a group consisting of a sulfite ester compound, a sulfonate ester compound, an alkali metal imide salt compound, a fluorosilane compound, and an organic disilane compound, or an organic disiloxane compound. The (A) component is subjected to oxidative decomposition on a positive electrode surface, and the decomposition product is accumulated on the positive electrode surface. However, in the nonaqueous electrolyte solution for batteries of the present invention, the oxidative decomposition of the (A) component on the positive electrode surface is suppressed by the (B) component.

The sulfite ester compounds include, for example, an aliphatic chain sulfite ester compound such as dimethylsulfite and diethylsulfite, a cyclic sulfite ester compound such as ethylenesulfite, 1,2-propylenesulfite, 1,3-propylenesulfite, 1,2-butylenesulfite, 1,3 butylenesulfite, 1,4-butylenesulfite, and 2,3-butylenesulfite. Among those compounds, the cyclic sulfite ester compound is preferred, more preferably ethylenesulfite. The sulfite ester compound may be used alone, or two or more kinds of the sulfite ester compounds may be used in combination.

In the nonaqueous electrolyte solution for batteries of the present invention, when the content of the sulfite ester compound is too small, a sufficient effect cannot be exercised, and when the content of the sulfite ester compound is too large, the extending effect matching the blending quantity cannot be obtained, and, to make matters worse, this may adversely impact the characteristics of the nonaqueous electrolyte solution for batteries. Accordingly, the content of the sulfite ester compound is preferably 0.01 to 5% by mass in the nonaqueous electrolyte solution for batteries, more preferably 0.03 to 4% by mass, even more preferably 0.05 to 3% by mass.

The sulfonate ester compound includes, for example, an aliphatic chain monosulfonate ester compound such as methyl ester methanesulfonate and ethyl ester methanesulfonate, a cyclic monosulfonate ester compound such as 1,3-propansultone, 1,3-butanesultone, 1,4-butanesultone, 2,4-butanesultone, 1,1,1-trifloro-2,4-butanesultone, 4,4,4-trifloro-1,3-butanesultone, 1,3-propenesultone, and 1,4-butylenesultone and a cyclic disulfonate ester compound such as methylene methane disulfonate (which is a compound represented by the following formula (3)) and ethylene methane disulfonate (which is a compound represented by the following formula (4)). Among those compounds, the cyclic monosulfonate ester compound and the cyclic disulfonate ester compound are preferred, more preferably the cyclic monosulfonate ester compound, even more preferably 1,3-propanesultone. The sulfonate ester compound may be used alone, or two or more kinds of the sulfonate ester compounds may be used in combination.

[Chemical Formula 3]

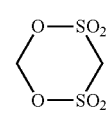

(3)

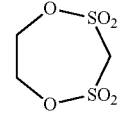

(4)

In the nonaqueous electrolyte solution for batteries of the present invention, when the content of the sulfonate ester compound is too small, a sufficient effect cannot be exercised, and when the content of the sulfonate ester compound is too large, the extending effect matching the blending quantity cannot be obtained, and, to make matters worse, this may adversely impact the characteristics of the nonaqueous electrolyte solution for batteries. Accordingly, the content of the sulfonate ester compound is preferably 0.01 to 5% by mass in the nonaqueous electrolyte solution for batteries, more preferably 0.03 to 4% by mass, even more preferably 0.05 to 3% by mass.

The alkali metal imide salt compound is preferably an alkali metal fluoro alkylsulfonyl imide salt or lithium imide salt compound, and lithium fluoro alkylsulfonyl imide salt is particularly preferred. The alkali metal imide salt compound includes, for example, bis(trifluoromethansulfonyl)imide lithium [Li(CF$_3$SO$_2$)$_2$N] and bis(pentafluoroethanesulfonyl)imide lithium [Li(C$_2$F$_5$SO$_2$)$_2$N], and bis(trifluoromethansulfonyl)imide lithium is particularly preferred. The alkali metal imide salt compound may be used alone, or two or more kinds of the alkali metal imide salt compounds may be used in combination.

In the nonaqueous electrolyte solution for batteries of the present invention, when the content of the alkali metal imide salt compound is too small, a sufficient effect cannot be exercised, and when the content of the alkali metal imide salt compound is too large, the extending effect matching the blending quantity cannot be obtained, and, to make matters worse, this may adversely impact the characteristics of the nonaqueous electrolyte solution for batteries. Accordingly, the content of the alkali metal imide salt compound is preferably 0.01 to 5% by mass in the nonaqueous electrolyte solution for batteries, more preferably 0.03 to 4% by mass, even more preferably 0.05 to 3% by mass.

The fluorosilane compound is a compound having at least one Si—F group in the molecule. The fluorosilane compound includes, for example, a fluorosilane compound represented by the following general formula (5).

[Chemical Formula 4]

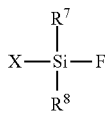

(5)

wherein $R^7$ and $R^8$ each independently represents an alkyl group having a carbon number of 1 to 8, an alkenyl group having a carbon number of 2 to 8, an alkynyl group having a carbon number of 2 to 8, a haloalkyl group having a carbon number of 1 to 8, an aryl group having a carbon number of 6 to 18, which may have halogen atoms, an aralkyl group having a carbon number of 7 to 18, a cycloalkyl group having a carbon number of 5 to 8, or a cycloalkenyl group having a carbon number of 5 to 8, X represents fluorine atoms, an alkyl group having a carbon number of 1 to 8, an alkenyl group having a carbon number of 2 to 8, an alkynyl group having a carbon number of 2 to 8, a haloalkyl group having a carbon number of 1 to 8, an aryl group having a carbon number of 6 to 18, which may have halogen atoms, an aralkyl group having a carbon number of 7 to 18, a group represented by the following general formula (6), or a group represented by the following general formula (7).

[Chemical Formula 5]

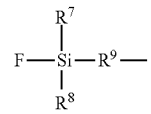

(6)

wherein $R^7$ and $R^8$ have the same definitions as the general formula (5), and $R^9$ represents a divalent hydrocarbon group having a carbon number of 1 to 15.

[Chemical Formula 6]

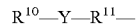

(7)

wherein $R^{10}$ represents an alkyl group having a carbon number of 1 to 8, an alkenyl group having a carbon number of 2 to 8, an alkynyl group having a carbon number of 2 to 8, a haloalkyl group having a carbon number of 1 to 8, an aryl group having a carbon number of 6 to 18, which may have halogen atoms, or an aralkyl group having a carbon number of 7 to 18, $R^{11}$ represents a divalent hydrocarbon group having a carbon number of 1 to 15, and Y represents oxygen atoms, —C(=O)—O— group, or —O—C(=O)— group.

In the general formula (5), $R^7$ and $R^8$ each independently represents an alkyl group having a carbon number of 1 to 8, an alkenyl group having a carbon number of 2 to 8, an alkynyl group having a carbon number of 2 to 8, a haloalkyl group having a carbon number of 1 to 8, an awl group having a carbon number of 6 to 18, which may have halogen atoms, an aralkyl group having a carbon number of 7 to 18, a cycloalkyl group having a carbon number of 5 to 8, or a cycloalkenyl group having a carbon number of 5 to 8. As the alkyl group having a carbon number of 1 to 8, the alkenyl group having a carbon number of 2 to 8, the alkynyl group having a carbon number of 2 to 8, and the haloalkyl group having a carbon number of 1 to 8, the alkyl group having a carbon number of 1 to 8, the alkenyl group having a carbon number of 2 to 8, and the alkynyl group having a carbon number of 2 to 8, and the haloalkyl group having a carbon number of 1 to 8 exemplified in the description of $R^1$ to $R^3$ in the general formula (1) may be used.

The aryl group having a carbon number of 6 to 18, which may have halogen atoms, includes, for example, phenyl, methylphenyl, dimethylphenyl, ethylphenyl, trimethylphenyl, propylphenyl, isopropylphenyl, butylphenyl, t-butylphenyl, pentylphenyl, t-pentylphenyl, hexylphenyl, heptylphenyl, octylphenyl, nonylphenyl, decylphenyl, undecylphenyl, dodecylphenyl, phenylphenyl, benzylphenyl, styrenated phenyl, 4-(1-methyl-1-phenylethyl)phenyl (also referred to as p-cumylphenyl), dinonylphenyl, α-naphthyl, β-naphthyl, 2-fluorophenyl, 3-fluorophenyl, 4-fluorophenyl, 2,4-difluorophenyl, 3,5-difluorophenyl, 2,6-difluorophenyl, 2,3-difluorophenyl, 4,5-difluorophenyl, 2,4,6-trifluorophenyl, 2,3,4-trifluorophenyl, and tetrafluorophenyl. The aralkyl group having a carbon number of 7 to 18 includes, for example, benzyl, 2-phenylethyl, 2-phenyl-2-propyl, 3-phenylpropyl, and diphenylmethyl. The cycloalkyl group having a carbon number of 5 to 8 includes, for example, cyclopentyl, cyclohexyl, cycloheptyl, methylcyclohexyl, cyclohexylmethyl, cyclooctyl, dimethylcyclohexyl, methylcyclohexylmethyl, and cyclohexylethyl. The cycloalkenyl group having a carbon number of 5 to 8 includes, for example, cyclopentenyl, cyclohexenyl, cycloheptenyl, and cyclooctenyl. As $R^7$ and $R^8$, from viewpoint of reduction of the internal resistance of the non-aqueous electrolyte secondary battery of the present invention, it is preferable that at least one of $R^7$ and $R^8$ is methyl or ethyl, it is more preferable that at least one is methyl, and it is even more preferable that both are each methyl.

In the general formula (5), X represents fluorine atoms, an alkyl group having a carbon number of 1 to 8, an alkenyl group having a carbon number of 2 to 8, an alkynyl group having a carbon number of 2 to 8, a haloalkyl group having a carbon number of 1 to 8, an aryl group having a carbon number of 6 to 18, which may have halogen atoms, an aralkyl group having a carbon number of 7 to 18, a group represented by the general formula (6), or a group represented by the general formula (7). As the alkyl group having a carbon number of 1 to 8, the alkenyl group having a carbon number of 2 to 8, the alkynyl group having a carbon number of 2 to 8, the haloalkyl group having a carbon number of 1 to 8, the aryl group having a carbon number of 6 to 18, which may have halogen atoms, and the aralkyl group having a carbon number of 7 to 18, groups exemplified in the description of $R^7$ and $R^8$ are included. X is preferably the alkyl group having a carbon number of 1 to 8, the group represented by the general formula (6), or the group represented by the general formula (7) from viewpoint of excellent battery characteristics at low temperature, more preferably the group represented by the general formula (7).

Meanwhile, when X is fluorine atoms, an alkyl group having a carbon number of 1 to 8, an alkenyl group having a carbon number of 2 to 8, an alkynyl group having a carbon number of 2 to 8, a haloalkyl group having a carbon number of 1 to 8, an aryl group having a carbon number of 6 to 18, which may have halogen atoms, or an aralkyl group having a carbon number of 7 to 18, and X may be a group the same as or different from $R^7$ or $R^8$. In this case, X is preferably the alkyl group having a carbon number of 1 to 8 or the haloalkyl group having a carbon number of 1 to 8 from viewpoint of reduction of the internal resistance of the nonaqueous electrolyte secondary battery and good charging properties, more preferably an alkyl group having a carbon number of 2 to 6 or a haloalkyl group having a carbon number of 2 to 6, even more preferably an alkyl group having a carbon number of 3 to 4 or a haloalkyl group having a carbon number of 3 to 4.

In the general formula (6), $R^7$ and $R^8$ have the same definitions in the general formula (5). As $R^7$ and $R^8$, from viewpoint of reduction of the internal resistance of the nonaqueous electrolyte secondary battery, it is preferable that at least one of $R^7$ and $R^8$ is methyl or ethyl, it is more preferable that at least one is methyl, and it is even more preferable that both are each methyl.

$R^9$ represents a divalent hydrocarbon group having a carbon number of 1 to 15. The divalent hydrocarbon group having a carbon number of 1 to 15 includes, for example, methanediyl (also referred to as methylene), 1,2-ethanediyl (also referred to as ethylene), 1,3-propanediyl (also referred to as trimethylene), 1,4-butanediyl (also referred to as tetramethylene), 1,5-pentanediyl, 1,6-hexanediyl (also referred to as hexamethylene), 1,7-heptanediyl, 1,8-octanediyl, 2-methyl-1,4-butanediyl, 1,2-ethenediyl (also referred to as ethenylene or vinylene), 2-butene-1,4-diyl, 1,2-dimethyl-1,2-ethenediyl, 1,2-ethynediyl (also referred to as ethynylene), 1,4-cyclohexanediyl, 1,2-phenylene, and 1,4-phenylene, (1,1'-biphenyl)-4,4'-diyl. $R^9$ is preferably 1,2-ethanediyl, 1,3-propanediyl, 1,4-butanediyl, 1,5-pentanediyl, 1,6-hexanediyl, 1,7-heptanediyl, 1,8-octanediyl, 2-methyl-1,4-butanediyl, 1,2-ethynediyl, and 1,2-phenylene from viewpoint of reduction of the internal resistance of the nonaqueous electrolyte secondary battery, more preferably, 1,2-ethanediyl, 1,3-propanediyl, and 1,4-butanediyl, even more preferably 1,2-ethanediyl.

In the general formula (7), $R^{10}$ represents an alkyl group having a carbon number of 1 to 8, an alkenyl group having a carbon number of 2 to 8, an alkynyl group having a carbon number of 2 to 8, or a haloalkyl group having a carbon number of 1 to 8, an aryl group having a carbon number of 6 to 18, which may have halogen atoms, or an aralkyl group having a carbon number of 7 to 18. As the alkyl group having a carbon number of 1 to 8, the alkenyl group having a carbon number of 2 to 8, and the alkynyl group having a carbon number of 2 to 8, and the haloalkyl group having a carbon number of 1 to 8, the aryl group having a carbon number of 6 to 18, which may have halogen atoms, or the aralkyl group having a carbon number of 7 to 18, groups exemplified in the description of $R^7$ and $R^8$ in the general formula (5) are included. $R^{10}$ is preferably the alkyl group having a carbon number of 1 to 8 from viewpoint of reduction of the internal resistance of the nonaqueous electrolyte secondary battery, more preferably an alkyl group having a carbon number of 1 to 4, even more preferably an alkyl group having a carbon number of 1 to 2.

$R^{11}$ represents a divalent hydrocarbon group having a carbon number of 1 to 15. $R^{11}$ includes the divalent hydrocarbon group having a carbon number of 1 to 15 exemplified in the description of $R^9$ in the general formula (6). $R^{11}$ is preferably 1,2-ethanediyl, 1,3-propanediyl, 1,4-butanediyl, 1,5-pentanediyl, 1,6-hexanediyl, 1,7-heptanediyl, 1,8-octanediyl, 2-methyl-1,4-butanediyl, 1,2-ethynediyl, or 1,2-phenylene from viewpoint of reduction of the internal resistance of the nonaqueous electrolyte secondary battery, more preferably 1,2-ethanediyl, 1,3-propanediyl, and 1,4-butanediyl, even more preferably 1,2-ethanediyl.

Y represents oxygen atoms, —C(=O)—O— group, or —O—C(=O)— group.

Among the compounds represented by the general formula (5) in which X is a fluorine atom, a preferred example of the compound includes, for example, butylmethyldifluorosilane, isobutylmethyldifluorosilane, pentylmethyldifluorosilane, hexylmethyldifluorosilane, heptylmethyldifluorosilane, octylmethyldifluorosilane, cyclopentylmethyldifluorosilane, cyclohexylmethyldifluorosilane, cycloheptylmethyldifluorosilane, cyclooctylmethyldifluorosilane, cyclopentylmethyl difluorosilane, cyclohexylmethyldifluorosilane, cycloheptylmethyldifluorosilane, and cyclooctylmethyldifluorosilane.

Among the compounds represented by the general formula (5) in which X is an alkyl group having a carbon number of 1 to 8, a preferred example of the compounds includes, for example, trimethylfluorosilane, ethyldimethylfluorosilane, propyldimethylfluorosilane, isopropyldimethylfluorosilane, butyldimethylfluorosilane, second butyldimethylfluorosilane, t-butyldimethylfluorosilane, pentyldimethylfluorosilane, hexyldimethylfluorosilane, heptyldimethylfluorosilane, octyldimethylfluorosilane, 2-ethylhexyldimethylfluorosilane, trifluoromethyldimethylfluorosilane, tetrafluoroethyldimethylfluorosilane, heptafluoropropyldimethylfluorosilane, 2,2,2-trifluoroethyldimethylfluorosilane, vinyldimethylfluorosilane, allyldimethylfluorosilane, 1-propenyldimethylfluorosilane, isopropenyldimethylfluorosilane, 2-butenyldimethylfluorosilane, 1,3-butadienyldimethylfluorosilane, 2-pentenyldimethylfluorosilane, 2-octenyldimethylfluorosilane, ethynyldimethylfluorosilane, 1-propynyldimethylfluorosilane, 2-propynyldimethylfluorosilane, 1-butynyldimethylfluorosilane, 2-butynyldimethylfluorosilane, 3-butynyldimethylfluorosilane, phenyldimethylfluorosilane, 2-fluorophenyldimethylfluorosilane, 3-fluorophenyldimethylfluorosilane, 4-fluorophenyldimethylfluorosilane, 2,4-difluorophenyldimethylfluorosilane, 3,5-difluorophenyldimethylfluorosilane, 2,6-difluorophenyldimethylfluorosilane, 2,3-difluorophenyldimethylfluorosilane, 4,5-difluorophenyldimethylfluorosilane, 2,4,6-trifluorophenyldimethylfluorosilane, 2,3,4-trifluorophenyldimethylfluorosilane, tetrafluorophenyldimethylfluorosilane, 2-methylphenyldimethylfluorosilane, 3-methylphenyldimethylfluorosilane, 4-methylphenyldimethylfluorosilane, 2,4-dimethylphenyldimethylfluorosilane, and 3,5-dimethylphenyldimethylfluorosilane.

Among the compounds represented by the general formula (5) in which X is the group represented by the general formula (6), a preferred example of the compounds includes, for example, 1,2-(dimethylfluorosilyl)ethane, 1,2-di(diethylfluorosilyl)ethane, 1,2-di(dipropylfluorosilyl)ethane, 1,2-di(dibutylfluorosilyl)ethane, 1,3-di(dimethylfluorosilyl)propane, 1,2-di(diethylfluorosilyl)propane, 1,3-di(dimethylfluorosilyl)propane, 1,2-di(diethylfluorosilyl)propane, 1,3-di(dipropylfluorosilyl)propane, 1,3-di(dibutylfluorosilyl)propane, 1,4-di(dimethylfluorosilyl)butane, 1,4-di(diethylfluorosilyl)butane, 1,4-di(dipropylfluorosilyl)butane, 1,4-di(dibutylfluorosilyl)butane, 1,5-di(dimethylfluorosilyl)pentane, 1,5-di(diethylfluorosilyl)pentane, 1,5-di(dipropylfluorosilyl)pentane, 1,5-di(dibuthylfluorosilyl)pentane, 1,6-di(dimethylfluorosilyl)hexane, 1,6-di(diethylfluorosilyl)hexane, 1,6-di(dipropylfluorosilyl)hexane, 6-di(dibuthylfluorosilyl)hexane, 1,7-di(dimethylfluorosilyl)heptane, 1,7-di(diethylfluorosilyl)heptane, 1,7-di(dipropylfluorosilyl)heptane, 1,7-di(dibuthylfluorosilyl)heptane, 1,8-di(dimethylfluorosilyl)octane, 1,8-di(diethylfluorosilyl)octane, 1,8-di(dipropylfluorosilyl)octane, 1,8-di(dibuthylfluorosilyl)octane, 1,4-di(dimethylfluorosilyl)-2-methylbutane, 1,4-di(diethylfluorosilyl)-2-methylbutane, 1,4-di(dipropylfluorosilyl)-2-methylbutane, 1,4-di(dibuthylfluorosilyl)-2-methylbutane, 1,2-di(dimethylfluorosilyl)acetylene, 1,2-di(diethylfluorosilyl)acetylene, 1,2-di(dipropylfluorosilyl)acetylene, 1,2-di(dibuthylfluorosilyl)acetylene, 1,4-di(dimethylfluorosilyl)benzene, 1,3-di(dimethylfluorosilyl)benzene, and 1,2-di(dimethylfluorosilyl)benzene.

Among the compounds represented by the general formula (5) in which X is the group represented by the general formula (7) and Y is the oxygen atom in the general formula (7), a preferred example of the compounds include, for example, 3-methoxypropyldimethylfluorosilane, 3-ethoxypropyldimethylfluorosilane, 3-propoxypropyldimethylfluorosilane, 3-butoxypropyldimethylfluorosilane, 3-pentoxypropyldimethylfluorosilane, 3-hexoxypropyldimethylfluorosilane, 4-methoxybutyldimethylfluorosilane, 4-ethoxybutyldimethylfluorosilane, 4-propoxybutyldimethylfluorosilane, 4-butoxybutyldimethylfluorosilane, 4-pentoxybutyldimethylfluorosilane, and 4-hexoxybutyldimethylfluorosilane.

Among the compounds represented by the general formula (5) in which X is the group represented by the general formula (7) and Y in the general formula (7) is the —C(=O)—O— group, a preferred example of the compounds includes, for example, acetic acid-2-(dimethylfluorosilyl)ethyl, acetic acid-3-(dimethylfluorosilyl)propyl, acetic acid-3-(dimethylfluorosilyl)butyl, acetic acid-3-(dimethylfluorosilyl)pentyl, acetic acid-3-(dimethylfluorosilyl)hexyl, propionic acid-2-(dimethylfluorosilyl)ethyl, propionic acid-3-(dimethylfluorosilyl)propyl, propionic acid-3-(dimethylfluorosilyl)butyl, propionic acid-3-(dimethylfluorosilyl)pentyl, propionic acid-3-(dimethylfluorosilyl)hexyl, butanoic acid-2-(dimethylfluorosilyl)ethyl, butanoic acid-3-(dimethylfluorosilyl)propyl, butanoic acid-4-(dimethylfluorosilyl)butyl, butanoic acid-5-(dimethylfluorosilyl)pentyl, and butanoic acid-6-(dimethylfluorosilyl)hexyl.

Among the compounds represented by the general formula (5) in which X is the group represented by the general formula (7) and Y in the general formula (7) is the —O—C(=O)— group, a preferred example of the compounds includes, for example, dimethylfluorosilylmethyl acetate, dimethylfluorosilylethyl acetate, dimethylfluorosilylbutyl acetate, dimethylfluorosilylpentyl acetate, dimethylfluorosilylhexyl acetate, 3-(dimethylfluorosilyl)propionic acid methyl, 3-(dimethylfluorosilyl)propionic acid ethyl, 3-(dimethylfluorosilyl)propionic acid propyl, 3-(dimethylfluorosilyl)propionic acid butyl, 3-(dimethylfluorosilyl)propionic acid pentyl, 3-(dimethylfluorosilyl)propionic acid hexyl, 4-(dimethylfluorosilyl)butanoic acid methyl, 4-(dimethylfluorosilyl)butanoic acid ethyl, 4-(dimethylfluorosilyl)butanoic acid propyl, 4-(dimethylfluorosilyl)butanoic acid butyl, 4-(dimethylfluorosilyl)butanoic acid pentyl, and 4-(dimethylfluorosilyl)butanoic acid hexyl. The fluorosilane compound may be used alone, or two or more kinds of the fluorosilane compound may be used in combination.

In the nonaqueous electrolyte solution for batteries of the present invention, when the content of the fluorosilane compound is too small, a sufficient effect cannot be exercised, and when the content of the fluorosilane compound is too large, the extending effect matching the blending quantity cannot be obtained, and, to make matters worse, this may adversely impact the characteristics of the nonaqueous electrolyte solution for batteries. Accordingly, the content of the fluorosilane compound is preferably 0.01 to 5% by mass in the nonaqueous electrolyte solution for batteries, more preferably 0.03 to 4% by mass, even more preferably 0.05 to 3% by mass.

The organic disilane compound is a compound having one Si—Si group in the molecule, and the organic disiloxane compound is a compound having one Si—O—Si group in the molecule. A preferred example of the organic disilane compound or the organic disiloxane compound as the (B) component of the present invention includes the compound represented by the following general formula (8).

[Chemical Formula 7]

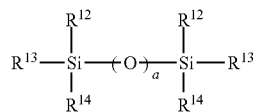
(8)

wherein $R^{12}$ and $R^{13}$ each independently represents an alkyl group having a carbon number of 1 to 8, an alkenyl group having a carbon number of 2 to 8, an alkynyl group having a carbon number of 2 to 8, a haloalkyl group having a carbon number of 1 to 8, an alkoxy alkyl group having a carbon number of 2 to 8, an aryl group having a carbon number of 6 to 18, which may have halogen atoms, or an aralkyl group having a carbon number of 7 to 18, $R^{14}$ represents an alkenyl group having a carbon number of 2 to 8, an alkynyl group having a carbon number of 2 to 8, an aryl group having a carbon number of 6 to 18, which may have halogen atoms, or an aralkyl group having a carbon number of 7 to 18, and a represents 0 or 1.

In the general formula (8), $R^{12}$ and $R^{13}$ independently represent an alkyl group having a carbon number of 1 to 8, an alkenyl group having a carbon number of 2 to 8, an alkynyl group having a carbon number of 2 to 8, a haloalkyl group having a carbon number of 1 to 8, an alkoxy alkyl group having a carbon number of 2 to 8, an aryl group having a carbon number of 6 to 18, which may have halogen atoms, or an aralkyl group having a carbon number of 7 to 18. As the alkyl group having a carbon number of 1 to 8, the alkenyl group having a carbon number of 2 to 8, the alkynyl group having a carbon number of 2 to 8, the haloalkyl group having a carbon number of 1 to 8, the aryl group having a carbon number of 6 to 18, which may have halogen atoms, and the aralkyl group having a carbon number of 7 to 18, the groups exemplified in the description of $R^7$ to $R^8$ in the general formula (5) are included. The alkoxy alkyl group having a carbon number of 2 to 8 includes, for example, methoxymethyl, methoxyethyl, methoxypropyl, ethoxyethyl, methoxybutyl, ethoxypropyl, propoxyethyl, methoxypentyl, ethoxybutyl, propoxypropyl, butoxyethyl, pentoxyethyl, butoxypropyl, hexoxyethyl, and pentoxypropyl.

$R^{12}$ and $R^{13}$ are preferably methyl, ethyl, propyl, isopropyl, butyl, pentyl, 3-chloropropyl, 3-chlorobutyl, or 4-chlorobutyl from viewpoint of reduction of the internal resistance of the nonaqueous electrolyte secondary battery, more preferably, methyl, ethyl, or propyl, even more preferably methyl or ethyl.

$R^{14}$ represents an alkenyl group having a carbon number of 2 to 8, an alkynyl group having a carbon number of 2 to 8, an aryl group having a carbon number of 6 to 18, which may have halogen atoms, or an aralkyl group having a carbon number of 7 to 18. As the alkenyl group having a carbon number of 2 to 8, the alkynyl group having a carbon number of 2 to 8, the aryl group having a carbon number of 6 to 18, which may have halogen atoms, or the aralkyl group having a carbon number of 7 to 18, the groups exemplified in the description of $R^7$ and $R^8$ in the general formula (5) are included.

$R^{14}$ is preferably vinyl or ethynyl from viewpoint of reduction of the internal resistance of the nonaqueous electrolyte secondary battery, more preferably vinyl.

a represents 0 or 1. The general formula (8) represents an organic disilane compound when a is 0 and represents an organic disiloxane compound when a is 1.

When a is 0, namely, in the organic disilane compound, a preferred example of the organic disilane compound includes, for example, 1,2-divinyl-1,1,2,2-tetramethyldisilane, 1,2-divinyl-1,1,2,2-tetraethyldisilane, 1,2-divinyl-1,1,2,2-tetrapropyldisilane, 1,2-divinyl-1,1,2,2-tetrabutyldisilane, 1,2-divinyl-1,1,2,2-tetrapentyldisilane, 1,2-divinyl-1,1,2,2-tetrahexyldisilane, 1,2-diethynyl-1,1,2,2-tetramethyldisilane, 1,2-diethynyl-1,1,2,2-tetraethyldisilane, 1,2-diethynyl-1,1,2,2-tetrapropyldisilane, 1,2-diethynyl-1,1,2,2-tetrabutyldisilane, 1,2-diethynyl-1,1,2,2-tetrapentyldisilane, and 1,2-diethynyl-1,1,2,2-tetrahexyldisilane.

When a is 1, namely, in the organic disiloxane compound, a preferred example of the organic disiloxane compound includes, for example, 1,3-divinyl-1,1,3,3-tetraethyldisiloxane, 1,3-divinyl-1,1,3,3-tetrapropyldisiloxane, 1,3-divinyl-1,1,3,3-tetrabutyldisiloxane, 1,3-divinyl-1,1,3,3-tetrapentyldisiloxane, 1,3-divinyl-1,1,3,3-tetrahexyldisiloxane, 1,3-diethynyl-1,1,3,3-tetramethyldisiloxane, 1,3-diethynyl-1,1,3,3-tetraethyldisiloxane, 1,3-diethynyl-1,1,3,3-tetrapropyldisiloxane, 1,3-diethynyl-1,1,3,3-tetrapentyldisiloxane, and 1,3-diethynyl-1,1,3,3-tetrahexyldisiloxane.

The organic disilane compound or the organic disiloxane compound is preferably 1,2-divinyl-1,1,2,2-tetramethyldisilane, 1,2-divinyl-1,1,2,2-tetraethyldisilane, 1,3-divinyl-1,1,3,3-tetraethyldisiloxane, and 1,3-divinyl-1,1,3,3-tetrapropyldisiloxane, more preferably 1,2-divinyl-1,1,2,2-tetramethyldisilane, or 1,3-divinyl-1,1,3,3-tetraethyldisiloxane. The organic disilane compound or the organic disiloxane compound may be used alone, or two or more kinds of them may be used in combination.

In the nonaqueous electrolyte solution for batteries of the present invention, when the content of the organic disilane compound or the organic disiloxane compound is too small, a sufficient effect cannot be exercised, and when the content of them is too large, the extending effect matching the blending quantity cannot be obtained, and, to make matters worse, this may adversely impact the characteristics of the nonaqueous electrolyte solution for batteries. Accordingly, the content of the organic disilane compound or the organic disiloxane compound is preferably 0.01 to 5% by mass in the nonaqueous electrolyte solution for batteries, more preferably 0.03 to 4% by mass, even more preferably 0.05 to 3% by mass.

In the (B) component in the nonaqueous electrolyte solution for batteries of the present invention, the sulfite ester compound, the sulfonate ester compound, the alkali metal imide salt compound, the fluorosilane compound, and the organic disilane compound or the organic disiloxane compound may be used singly or in combination. When the components are used singly, the fluorosilane compound is preferably used. When the components are used in combination, a combination of the sulfite ester compound or the sulfonate ester compound and the fluorosilane compound is preferably used. When the components are used in combination, the mass ratio of the sulfite ester compound or the sulfonate ester compounds to the fluorosilane compound is preferably 0.05 to 10, more preferably 0.1 to 5, even more preferably 0.2 to 2.

When a combination of the sulfite ester compound, the sulfonate ester compound, the alkali metal imide salt compound, the fluorosilane compound, and the organic disilane compound or the organic disiloxane compound are used in combination as the (B) component, when the total amount is too small, a sufficient effect cannot be exercised, and when the total amount is too large, the extending effect matching the blending quantity cannot be obtained, and, to make matters worse, this may adversely impact the characteristics of the nonaqueous electrolyte solution for batteries. Accordingly, the total amount of the (B) component is preferably 0.01 to 5% by mass, in the nonaqueous electrolyte solution for batteries more preferably 0.03 to 4% by mass, even more preferably 0.05 to 3% by mass.

<(C) Component>

The (C) component in the nonaqueous electrolyte solution for batteries of the present invention is an organic solvent. As the organic solvent used in the present invention, one or a combination of two or more kinds of organic solvents normally used in the nonaqueous electrolyte solution for batteries may be used. Such organic solvents include, for example, a saturated cyclic carbonate compound, a saturated cyclic ester compound, a sulfone or sulfoxide compound, an amide compound, a saturated chain carbonate compound, a chain ether compound, a cyclic ether compound, and a saturated chain ester compound.

Since the saturated cyclic carbonate compound, the saturated cyclic ester compound, the sulfone or sulfoxide compound, and the amide compound have a high relative permittivity, they serve to increase a permittivity of an electrolyte solution. Among those compounds, the saturated cyclic carbonate compound is preferred. The saturated cyclic carbonate compound includes, for example, ethylene carbonate, 1,2-propylene carbonate, 1,3-propylene carbonate, 1,2-butylene carbonate, 1,3-butylene carbonate, and 1,1-dimethylethylene carbonate. The saturated cyclic ester compound includes, for example, γ-butyrolactone, γ-valerolactone, γ-caprolactone, δ-hexanolactone, and δ-octanolactone. The sulfoxide compound includes, for example, dimethyl sulfoxide, diethyl sulfoxide, dipropyl sulfoxide, diphenyl sulfoxide, and thiophene. The sulfone compound includes, for example, dimethyl sulfone, diethyl sulfone, dipropyl sulfone, diphenyl sulfone, sulfolane (also referred to as tetramethylene sulfone), 3-methylsulfolane, 3,4-dimethylsulfolane, 3,4-diphenylmethylsulfolane, sulfolene, 3-methylsulfolene, 3-ethylsulfolene, and 3-bromomethylsulfolene, and sulfolane and tetramethylsulfolane are preferred. The amide compound includes, for example, N-methylpyrrolidone, dimethylformamide, and dimethylacetamide.

The saturated cyclic carbonate compound, the chain ether compound, the cyclic ether compound, and the saturated chain ester compound can realize excellent battery characteristics such as output density, and, for example, a lower level of viscosity of the nonaqueous electrolyte solution for batteries and a higher level of mobility of electrolyte ions. Since those compounds have a low viscosity, a performance of the nonaqueous electrolyte solution for batteries at low temperature can be enhanced. Among those compounds, the saturated chain carbonate compound is preferred. The saturated chain carbonate compound includes, for example, dimethyl carbonate (DMC), ethylmethyl carbonate (EMC), diethyl carbonate (DEC), ethylbutyl carbonate, methyl-t-butyl carbonate, diisopropyl carbonate, and t-butylpropyl carbonate. The chain or cyclic ether compound includes, for example, dimetoxyethane (DME), etoxymetoxyethane, dietoxyethane, tetrahydrofuran, dioxolan, dioxane, 1,2-bis(methoxycarbonyloxy)ethane, 1,2-bis(ethoxycarbonyloxy)ethane, 1,2-bis(ethoxycarbonyloxy)propane, ethylene glycol bis(trifluoroethyl)ether, propylene glycol bis(trifluoroethyl)ether, ethylene glycol bis(trifluoromethyl)ether, and diethylene glycol bis(trifluoroethyl)ether, and dioxolan is preferred among those compounds.

The saturated chain ester compound is preferably a monoester compound or a diester compound in which the total carbon number in the molecule is 2 to 8, and specific examples of the compounds include methyl formate, ethyl formate, methyl acetate, ethyl acetate, propyl acetate, isobutyl acetate, butyl acetate, methyl propionate, ethyl propionate, methyl butyrate, methyl isobutyrate, methyl trimethylacetate, ethyl trimethylacetate, methyl malonate, ethyl malonate, methyl succinate, ethyl succinate, 3-methoxy propionic acid methyl ester, 3-methoxy propionic acid ethyl ester, ethylene glycol diacetyl, and propylene glycol diacetyl. Among those compounds, methyl formate, ethyl formate, methyl acetate, ethyl acetate, propyl acetate, isobutyl acetate, butyl acetate, and methyl propionate, and ethyl propionate are preferred.

When the organic solvent is a mixture of one or more organic solvent (C1) selected from a group consisting of a saturated cyclic carbonate compound, a saturated cyclic ester compound, a sulfone or sulfoxide compound, and an amide compound with one or more organic solvent (C2) selected from a group consisting of a saturated chain carbonate compound, a chain ether compound, a cyclic ether compound, and a saturated chain ester compound, the organic solvent is preferred because there can be provided the nonaqueous electrolyte solution for batteries which has excellent cycling characteristics and well-balanced viscosity of the nonaqueous electrolyte solution for batteries and electrical capacitance and output of a battery to be obtained, and the organic solvent is more preferably a mixture of the saturated cyclic carbonate compound used as the organic solvent C1 with the saturated chain carbonate compound used as the organic solvent C2. When the organic solvent of the (C) component is a mixture of the organic solvent C1 with the organic solvent C2, the mixing ratio (mass standard) is preferably 1:10 to 10:1, more preferably 3:10 to 10:3.

In the nonaqueous electrolyte solution for batteries, although the battery characteristics are sometimes rapidly deteriorated at low temperature, it is preferable in order to improve the deterioration of the battery characteristics at low temperature that the nonaqueous electrolyte solution for batteries contains the saturated chain ester compound as a part of the (C) component, and especially when the organic solvent is a mixture of the saturated cyclic carbonate compound, the saturated chain carbonate compound, and the saturated chain ester compound, the deterioration of the battery characteristics at low temperature can be significantly improved. The content of the saturated chain ester compound in the (C) component is preferably 0.5 to 30% by mass, more preferably 1 to 10% by mass.

As other organic solvents, acetonitrile, propionitrile, nitromethane, and derivatives thereof may be used.

<(D) Component>

The (D) component of the nonaqueous electrolyte solution for batteries of the present invention is electrolyte salt. As the electrolyte salt used in the nonaqueous electrolyte solution for batteries of the present invention, a conventional well-known electrolyte salt is used, and the electrolyte salt includes, for example, $LiPF_6$, $LiBF_4$, $LiAsF_6$, $LiCF_3SO_3$, $LiCF_3CO_2$, $LiN(CF_3SO_2)_2$, $LiC(CF_3SO_2)_3$, $LiB(CF_3SO_3)_4$, $LiB(C_2O_4)_2$, $LiBF_2(C_2O_4)$, $LiSbF_6$, $LiSiF_5$, $LiAlF_4$, $LiSCN$, $LiClO_4$, $LiCl$, $LiF$, $LiBr$, $LiI$, $LiAlF_4$, $LiAlCl_4$, $NaClO_4$, $NaBF_4$, $NaI$, and derivatives thereof. Among those electrolyte salts, it is preferable, from viewpoint of excellent electrical characteristics, to use one or more kinds of electrolyte salt selected from a group consisting of $LiPF_6$, $LiBF_4$, $LiClO_4$, $LiAsF_6$, $LiCF_3SO_3$, the derivatives of $LiC(CF_3SO_2)_3$ and $LiCF_3SO_3$, and the derivative of $LiC(CF_3SO_2)_3$.

It is preferable that the electrolyte salt is dissolved in the above organic solvent so that the concentration in the nonaqueous electrolyte solution for batteries of the present invention is 0.1 to 3.0 mol/L, particularly 0.5 to 2.0 mol/L. When the concentration of the electrolyte salt is less than 0.1 mol/L, a sufficient current density may not be obtained, and when the concentration of the electrolyte salt is more than 3.0 mol/L, the stability of the nonaqueous electrolyte solution for batteries may be lost.

<(E) Component>

It is preferable in order to form a coat on an electrode surface matching the characteristics of the respective active materials of the positive electrode and the negative electrode that the nonaqueous electrolyte solution for batteries of the present invention further contains, as the (E) component, at least one carbonate compound selected from a group consisting of an unsaturated cyclic carbonate compound, an unsaturated chain carbonate compound, an unsaturated diester compound, and a halogen-containing cyclic carbonate compound.

In this invention, the unsaturated cyclic carbonate compound is a carbonate compound having carbon-carbon unsaturated bond inside or outside a ring having a carbonate group. The unsaturated cyclic carbonate compound includes, for example, vinylene carbonate, 1-methyl vinylene carbonate, 1,2-dimethyl vinylene carbonate, 1-phenyl vinylene carbonate, 1,2-diphenyl vinylene carbonate, ethylidene ethyl carbonate, vinyl ethylene carbonate, 1,2-di-vinyl ethylene carbonate, styrene carbonate, 1,2-diphenyl ethylene carbonate, and catechol carbonate.

The unsaturated chain carbonate compound includes, for example, allyl methyl carbonate, allyl ethyl carbonate, diallyl carbonate, methyl vinyl carbonate, divinyl carbonate, methyl phenyl carbonate, t-butyl phenyl carbonate, diphenyl carbonate, dibenzyl carbonate, dipropargyl carbonate, propargyl methyl carbonate, ethyl propargyl carbonate, bis(1-methyl propargyl)carbonate, bis(1,1-dimethyl propargyl) carbonate, 2-butyne-1,4-diol dimethyl dicarbonate, 2-butine-1,4-diol isopropyl dicarbonate, -butine-1,4-diol bis (3-chloropropyl)dicarbonate, 2,4-hexadiyne-1,6-diol dimethyl dicarbonate, 2,4-hexadiyne-1,6-diol isopropyl dicarbonate, and 2,4-hexadiyne-1,6-diol bis(3-chloropropyl) dicarbonate.

The unsaturated diester compound includes, for example, dimethyl maleate, diethyl maleate, dipropyl maleate, dibutyl maleate, dipentyl maleate, dihexyl maleate, diheptyl maleate, dioctyl maleate, dimethyl fumarate, diethyl fumarate, dipropyl fumarate, dibutyl fumarate, dipentyl fumarate, dihexyl fumarate, diheptyl fumarate, dioctyl fumarate, dimethyl acetylenedicarboxylate, diethyl acetylenedicarboxylate, dipropyl acetylenedicarboxylate, dibutyl acetylenedicarboxylate, dipentyl acetylenedicarboxylate, dihexyl acetylenedicarboxylate, diheptyl acetylenedicarboxylate, and dioctyl acetylenedicarboxylate.

The halogen-containing cyclic carbonate compound includes, for example, chloroethylene carbonate, 1,2-dichloroethylene carbonate, fluoroethylene carbonate, 1,2-difluoroethylene carbonate, and trifluoromethylethylene carbonate.

Among the above (E) components, vinylene carbonate, vinylethylene carbonate, dipropargyl carbonate, dimethyl acetylenedicarboxylate, diethyl acetylenedicarboxylate, chloroethylene carbonate, dichloroethylene carbonate, and fluoroethylene carbonate are preferred, more preferably vinylene carbonate, dipropargyl carbonate, dimethyl acetylenedicarboxylate, chloroethylene carbonate, and fluoroethylene carbonate, even more preferably vinylene carbonate, dipropargyl carbonate, chloroethylene carbonate, and fluoroethylene carbonate. The (E) component may be used alone, or two or more kinds of the (E) component may be used in combination.

In the nonaqueous electrolyte solution for batteries of the present invention, when the content of the (E) component is too small, a sufficient effect cannot be exercised, and when the content of the (E) component is too large, the extending effect matching the blending quantity cannot be obtained, and, to make matters worse, this may adversely impact the characteristics of the nonaqueous electrolyte solution for batteries. Accordingly, the content of the (E) component is preferably 0.005 to 10% by mass in the nonaqueous electrolyte solution for batteries, more preferably 0.02 to 5% by mass, even more preferably 0.05 to 3% by mass.

For the purpose of imparting flame resistance to the nonaqueous electrolyte solution for batteries of the present invention, a flame retardant such as a halogenated flame retardant, a phosphorous flame retardant, and other flame retardants may be suitably added to the nonaqueous electrolyte solution for batteries. When the additive amount of the flame retardant is too small, a sufficient flame-retardant effect cannot be exercised, and when the additive amount of the flame retardant is too large, the extending effect matching the blending quantity cannot be obtained, and, to make matters worse, this may adversely impact the characteristics of the nonaqueous electrolyte solution for batteries. Accordingly, the additive amount of the flame retardant is preferably 5 to 100% by mass, more preferably 10 to 50% by mass, based on the organic solvent constituting the nonaqueous electrolyte solution for batteries of the present invention.

Although the above-described nonaqueous electrolyte solution for batteries of the present invention may be used as the nonaqueous electrolyte solution for batteries of both a primary battery and a secondary battery, the nonaqueous electrolyte solution for batteries of the present invention is suitably usable as the nonaqueous electrolyte solution for batteries constituting the secondary battery, particularly a lithium ion secondary battery.

Next, a nonaqueous electrolyte secondary battery of the present invention will be described.

The nonaqueous electrolyte secondary battery of the present invention has a negative electrode, a positive electrode, and a nonaqueous electrolyte solution and further has a separator between the negative electrode and the positive electrode according to need. The nonaqueous electrolyte secondary battery has a feature in that the nonaqueous electrolyte solution for batteries of the present invention is used as the nonaqueous electrolyte solution. In particular, among nonaqueous electrolyte secondary batteries, when the nonaqueous electrolyte solution of the present invention is used, more significant effects can be obtained in a nonaqueous electrolyte secondary battery having a negative electrode containing a polymeric carboxylic compound and a positive electrode containing a nickel compound or an iron compound as an active material.

The negative electrode is usually fabricated by coating and drying, on a metal collector, a negative electrode material such as a negative electrode active material and a binder (binding agent) slurried with a solvent such as an organic solvent or a water-based solvent and, if necessary, extending by application of pressure to form a sheet-like negative electrode, and the polymeric carboxylic compound is used as a binder used when a negative electrode is fabricated or a thickener used when a negative electrode material is slurried with a water solvent. In the polymeric carboxylic compound, when the carboxyl group is adsorbed to a surface of, for example, a metal collector, an electrode active material, or an electroconductive material, a good dispersibility is obtained in a water-based solvent, and, at the same time, an excellent binding property can be obtained in the formation into a negative electrode.

The polymeric carboxylic compound includes, for example, polyacrylic acid, polymethacrylic acid, acrylic acid/olefin copolymer, acrylic acid/maleate copolymer, methacrylic acid/olefin copolymer, methacrylic acid/maleate copolymer, fumaric acid/styrene copolymer, fumaric acid/C2 to 5 olefin copolymer, maleic acid/styrene copolymer, maleic acid/C2 to 5 olefin copolymer, carboxymethylcellulose, and algin acid. C2 to 5 olefins of fumaric acid/C2 to 5 olefin copolymer and maleic acid/C2 to 5 copolymer include, for example, ethylene, propylene, 1-butene, 2-butene, isobutene, 1-propylene, 2-propylene, 1-propylene, 2-propylene, isopropylene, and cyclopropylene.

Among the polymeric carboxylic compounds, since an electrode excellent in the dispersibility of a crystalline carbon material and highly resistant to an electrolyte solution is obtained, polyacrylic acid and carboxymethylcellulose are preferred, more preferably carboxymethylcellulose. It is preferable from viewpoint of the solubility in water and the dispersibility in water of, for example, an electrode active material, and an electroconductive material that the polymeric carboxylic compound is neutralized or partially neutralized, and it is more preferable that the polymeric carboxylic compound is neutralized or partially neutralized with alkali metal. Such an alkali metal includes, for example, lithium, sodium, potassium, rubidium, and cesium, and among those alkali metals, lithium, sodium and potassium are preferred, more preferably lithium and sodium, even more preferably lithium.

When the polymeric carboxylic compound is polyacrylic acid, if the molecular weight is too small, the binding force is reduced, and if the molecular weight is too large, the slurry viscosity is too high to reduce the workability; therefore, the mass average molecular weight is preferably 30000 to 1500000, more preferably 50000 to 300000.

When the polymeric carboxylic compound is carboxymethylcellulose, a degree of etherification (the number of carboxymethyl ether groups per glycol unit) is preferably 0.6 to 1.1, preferably 0.8 to 1.0. When the polymeric carboxylic compound is lithium salt or sodium salt of carboxymethylcellulose, the viscosity of a 1% by mass aqueous solution at 20° C. is preferably 500 to 5000 mPa·s, more preferably 900 to 3000 mPa·s.

When the usage of the polymeric carboxylic compound is too small, the dispersibility of a negative electrode active material is insufficient and may be eccentrically-located in a negative electrode. When the usage is too large, polymeric carboxylic compound excessively coats the negative electrode active material to have adverse affects on movement of lithium ions, and resistance may occur. Accordingly, the usage of the polymeric carboxylic compound is preferably 0.001 to 5 parts by mass, more preferably 0.05 to 3 parts by mass, even more preferably 0.01 to 2 parts by mass, based on 100 parts by mass of the negative active material to be described later.

The negative electrode active material includes, for example, a crystalline carbon material such as artificial graphite and natural graphite and a single metal such as lithium, tin, zinc, and aluminum or alloy thereof, and among those negative electrode active materials, the crystalline carbon material is preferred. The average particle diameter of the crystalline carbon material is preferably not more than 30 µm since the negative electrode capacity increases, more preferably not more than 20 µm. Although the reactivity of a surface of the crystalline carbon material is high, the specific surface area is increased to approximately 2 to 5 $m^2/g$ by minor crystallization, and therefore, this causes facilitation of a decomposition reaction of, for example, a polymeric carboxylic compound on the surface of the crystalline carbon material. The nonaqueous electrolyte solution for batteries of the present invention can realize the reduction of the decomposition reaction of the polymeric carboxylic compound in the negative electrode using the crystalline carbon material as a negative electrode active material.

In addition, the negative electrode may contain, for example, an electroconductive material such as furnace black, acetylene black, ketjen black, vapor grown carbon fiber (VGCF), and carbon nanofiber and other binders or thickeners such as styrene-butadiene rubber (SBR), polyvinylchloride, polyvinylpyrrolidone, polytetrafluoroethylene, polyvinylidene-fluoride, polyethylene, polypropylene, polyimide, polyvinyl alcohol, methylcellulose, and hydroxyethyl cellulose for the purpose of enhancing the electroconductive property in the negative electrode. The usage of the electroconductive material is preferably 0.01 to 10 parts by mass, more preferably 0.1 to 5 parts by mass, based on 100 parts by mass of the negative electrode active material. The usage of the above other binders or thickeners is preferably 0.01 to 5 parts by mass, more preferably 0.1 to 2 parts by mass, based on 100 parts by mass of the negative electrode active material.

Although a water-based solvent such as an organic solvent and water is used as the slurry solvent, the water-based solvent is preferably used. The organic solvent includes, for example, a similar one to that used in the positive electrode. The usage of the solvent is preferably 30 to 300 parts by mass, more preferably 50 to 200 parts by mass, based on 100 parts by mass of the negative electrode active material.

As the collector of the negative electrode, copper, nickel, stainless steel, nickel plate steel, aluminum, or the like is usually used.

As the positive electrode of the secondary battery, a positive electrode material such as a positive electrode active material, a binder (binding agent), and an electroconductive material is slurried with a solvent such as an organic solvent or water to be coated and dried on a collector, and, thus, to be extended by application of pressure according to need so as to be formed into a sheet, whereby the positive electrode of the secondary battery is obtained and used.

The positive electrode active material is not limited especially as long as it can electrochemically occlude and discharge lithium ions, and a material containing lithium and at least one kind of transition metals is preferred and includes, for example, lithium transition metal composite oxide and lithium-containing transition metal phosphate compound. Those positive electrode active materials may be mixed in use.

As the transition metal of the lithium transition metal composite oxide, vanadium, titanium, chrome, manganese, iron, cobalt, nickel, and copper are preferred, and specific examples include lithium cobalt composite oxide such as $LiCoO_2$, lithium nickel composite oxide such as $LiNiO_2$, lithium manganese composite oxide such as $LiMnO_2$, $LiMn_2O_4$, and $Li_2MnO_3$, and transition metals obtained by replacing a part of transition metal atom as main constituents of those lithium transition metal composite oxides by other metals such as aluminum, titanium, vanadium, chrome, manganese, iron, cobalt, lithium, nickel, copper, zinc, magnesium, gallium, and zirconium. Specific examples of the replaced transition metal include, for example, $LiNi_{0.5}Mn_{0.5}O_2$, $LiNi_{0.8}Co_{0.17}Al_{0.03}O_2$, $LiNi_{1/3}Co_{1/3}Mn_{1/3}O_2$, $LiMn_{1.8}Al_{0.2}O_4$, and $LiMn_{1.5}Ni_{0.5}O_4$.

The transition metal of the lithium-containing transition metal phosphate compound is preferably vanadium, titanium, manganese, iron, cobalt, or nickel, and specific examples of the transition metal of the lithium-containing transition metal phosphate compound include, for example, an iron phosphate group such as $LiFePO_4$, a cobalt phosphate group such as $LiCoPO_4$, and transition metals obtained by replacing a part of transition metal atoms as main constituents of those lithium transition metal phosphate compounds by other metals such as aluminum, titanium, vanadium, chrome, manganese, iron, cobalt, lithium, nickel, copper, zinc, magnesium, gallium, zirconium, and niobium.

Among those lithium transition metal phosphate compounds, it is even more preferable that lithium-nickel-containing composite oxide and lithium iron phosphate compound are used because a protective layer of a positive electrode surface, which prevents oxidative decomposition of an unsaturated phosphate ester compound represented by the general formula (1) and an unsaturated phosphate ester compound represented by the general formula (2) as the (A) components of the present invention, is easily generated.

The binder of the positive electrode includes, for example, polyvinylidene-fluoride, polytetrafluoroethylene, EPDM, SBR, NBR, fluororubber, and polyacrylic acid and is not limited to them. The usage of the binder is preferably 0.1 to 20 parts by mass, more preferably 0.5 to 10 parts by mass, based on 100 parts by mass of the positive electrode active material.

As The electroconductive material of the positive electrode, fine particles of graphite, carbon black such as acetylene black and ketjen black, fine particles of amorphous carbon such as needle coke, carbon nanofiber, or the like is used; however, the electroconductive material of the positive electrode is not limited thereto. The usage of the electroconductive material is preferably 0.01 to 20 parts by mass, more preferably 0.1 to 10 parts by mass, based on 100 parts by mass of the positive electrode active material.

As the slurry solvent, organic solvent dissolving the binder or water is used. The organic solvent includes, for example, N-methylpyrrolidone, dimethylformamide, dimethylacetamide, methyl ethyl ketone, cyclohexanone, methyl acetate, methyl acrylate, diethyl triamine, N—N-dimethylaminopropylamine, polyethylene oxide, and tetrahydrofuran and are not limited to them. The usage of the solvent is preferably 30 to 300 parts by mass, more preferably 50 to 200 parts by mass, based on 100 parts by mass of the positive electrode active material.

As the collector of the positive electrode, aluminum, stainless steel, nickel plate steel, or the like is usually used.

Although the nonaqueous electrolyte secondary battery of the present invention uses a separator between the positive electrode and the negative electrode according to need, a usually used polymer microporous film can be used as the separator without being particularly limited. The film includes, for example, a polymer compound mainly composed of, for example, polyethers such as polyethylene, polypropylene, polyvinylidene fluoride, polyvinylidene chloride, polyacrylonitrile, polyacrylamide, polytetrafluoroethylene, polysulfone, polyethersulfone, polycarbonate, polyamide, polyimide, polyethylene oxide, and polypropylene oxide, various celluloses such as carboxymethylcellulose and hydroxypropylcellulose, poly(meth)acrylic acid or various esters thereof or derivatives thereof and a copolymer or mixture of such polymers. Each of those films may be used singly or a plurality thereof may be laminated to use as a multilayered film. Those films may contain various additives, and types and contents thereof are not particularly limited. Among those films, films formed of polyethylene, polypropylene, polyvinylidene fluoride, or polysulfone are suitably used in the nonaqueous electrolyte secondary battery of the present invention.

The above films are provided with micropores to facilitate impregnation of the electrolyte solution and hence transmission of ions. The method for forming micropores includes, for example, a "phase-separation method", in which a film is formed from a solution containing a polymer and a solvent under such conditions that microscopic phase separation takes place, and then only the solvent is removed by extraction to form micropores in the film and a "drawing method", in which a molten polymer is extruded at a high draft ratio to form a film, and the film is heat-treated to uniaxially orient crystals and then drawn to form micropores while forming gaps between the crystals. The method is suitably selected according to the film to be used.

In the nonaqueous electrolyte secondary battery of the present invention, the electrode material, the nonaqueous electrolyte solution for batteries, and the separator may contain a phenolic antioxidant, a phosphorous-containing antioxidant, a thioether-type antioxidant, hindered amine compound, or the like for further improving safety.

The phenolic antioxidant includes, for example, 1,6-hexamethylenebis[(3-tert-butyl-5-methyl-4-hydroxyphenyl)propionamide], 4,4'-thiobis(6-t-butyl-m-cresol), 4,4'-butylidenebis(6-t-butyl-m-cresol), 1,1,3-tris(2-methyl-4-hydroxy-5-t-butylphenyl)butane, 1,3,5-tris(2,6-dimethyl-3-hydroxy-4-t-butylbenzyl)isocyanurate, 1,3,5-tris(3,5-di-t-butyl-4-hydroxybenzyl)isocyanurate, 1,3,5-tris(3,5-di-t-butyl-4-hydroxybenzyl)-2,4,6-trimethylbenzene, tetrakis[3-(3,5-di-t-butyl-4-hydroxyphenyl)methylpropionate] methane, thiodiethylene glycol bis[(3,5-di-t-butyl-4-hydroxyphenyl)propionate], 1,6-hexamethylene bis[(3,5-di-t-butyl-4-hydroxyphenyl)propionate], bis[3,3-bis(4-hydroxy-3-t-butylphenyl)butyric acid]glycol ester, bis[2-t-butyl-4-methyl-6-(2-hydroxy-3-t-butyl-5-methylbenzyl)phenyl]terephthalate, 1,3,5-[(3,5-di-t-butyl-4-hydroxyphenyl)propionyloxyethyl]isocyanurate, 3,9-bis[1,1-dimethyl-2-{(3-t-butyl-4-hydroxy-5-methylphenyl)propionyloxy}ethyl]-2,4,8,10-tetraoxaspiro[5.5]undecane, and triethylene glycol bis[(3-t-butyl-4-hydroxy-5-methylphenyl)propionate]. When the phenolic antioxidant is added to the electrode material, the content is preferably 0.01 to 10 parts by mass, particularly preferably 0.05 to 5 parts by mass, based on 100 parts by mass of the electrode material.

The phosphorous-containing antioxidant includes, for example, trisnonylphenylphosphite, tris[2-t-butyl-4-(3-t-butyl-4-hydroxy-5-methylphenylthio)-5-methylphenyl]phosphite, tridecyl phosphite, octyl diphenyl phosphite, di(decyl)monophenyl phosphite, di(tridecyl)pentaerythritol diphosphite, di(nonylphenyl)pentaerythritol diphosphite, bis(2,4-di-t-butylphenyl)pentaerythritol diphosphite, bis(2,6-di-t-butyl-4-methylphenyl)pentaerythritol diphosphite, bis(2,4,6-tri-t-butylphenyl)pentaerythritol diphosphite, bis(2,4-dicumylphenyl)pentaerythritol diphosphite, tetra(tridecyl)isopropylidenediphenol diphosphite, tetra(tridecyl) 4,4'-n-butylidenebis(2-t-butyl-5-methylphenol)diphosphite, hexa(tridecyl)1,1,3-tris(2-methyl-4-hydroxy-5-t-butylphenyl)butane triphosphite, tetrakis(2,4-di-t-butylphenyl)biphenylene diphosphonite, 9,10-dihydro-9-oxa-10-phosphaphenanthrene-10-oxide, 2,2'-methylenebis(4,6-t-butylphenyl) 2-ethylhexyl phosphite, 2,2'-methylenebis(4,6-di-t-butylphenyl)octadecyl phosphite, 2,2'-ethylidenebis(4,6-di-t-butylphenyl)fluorophosphite, tris(2-[(2,4,8,10-tetrakis-t-butyldibenzo[d,f][1,3,2]dioxaphosphepin-6-yl)oxy]ethyl)amine, 2-ethyl-2-butylpropylene glycol, and 2,4,6-tri-t-butylphenol phosphite.

The thioether-type antioxidant includes, for example, dialkyl thiodipropionates such as dilauryl thiodipropionate, dimyristyl thiodipropionate, and distearyl thiodipropionate and pentaerythritol tetra(β-alkylmercaptopropionate) esters.

The hindered amine compound includes, for example, 2,2,6,6-tetramethyl-4-piperidyl stearate, 1,2,2,6,6-pentamethyl-4-piperidyl stearate, 2,2,6,6-tetramethyl-4-piperidyl benzoate, bis(2,2,6,6-tetramethyl-4-piperidyl)sebacate, tetrakis(2,2,6,6-tetramethyl-4-piperidyl)1,2,3,4-butanetetracarboxylate, tetrakis(1,2,2,6,6-pentamethyl-4-piperidyl)1,2,3,4-butanetetracarboxylate, bis(2,2,6,6-tetramethyl-4- piperidyl)di(tridecyl)1,2,3,4-butanetetracarboxylate, bis(1,2,2,6,6-pentamethyl-4-piperidyl)di(tridecyl)-1,2,3,4-butane tetracarboxylate, bis(1,2,2,4,4-pentamethyl-4-piperidyl)2-butyl-2-(3,5-di-t-butyl-4-hydroxybenzyl) malonate, 1-(2-hydroxyethyl)-2,2,6,6-tetramethyl-4-piperidinol/diethyl succinate polycondensate, 1,6-bis(2,2,6,6-tetramethyl-4-piperidylamino)hexane/2,4-dichloro-6-morpholino-s-triazine polycondensate, 1,6-bis(2,2,6,6-tetramethyl-4-piperidylamino)hexane/2,4-dichloro-6-t-octylamino-s-triazine polycondensate, 1,5,8,12-tetrakis[2,4-bis(N-butyl-N-(2,2,6,6-tetramethyl-4-piperidyl)amino)-s-triazin-6-yl]-1,5,8,12-tetraazadodecane, 1,5,8,12-tetrakis[2,4-bis(N-butyl-N-(1,2,2,6,6-pentamethyl-4-piperidyl)amino)-s-triazin-6-yl]-1,5,8,12-tetraazadodecane, 1,6,11-tris[2,4-bis(N-butyl-N-(2,2,6,6-tetramethyl-4-piperidyl)amino)-s-triazin-6-yl] aminoundecane, and 1,6,11-tris[2,4-bis(N-butyl-N-(1,2,2,6,6-pentamethyl-4-piperidyl)amino)-s-triazin-6-yl] aminoundecane.

For the nonaqueous electrolyte secondary battery of the present invention, which is constituted as above, its shape is not particularly limited and may have any of various shapes such as coin-shape, cylinder, and box-shape. FIG. 1 illustrates an example of the coin-shaped nonaqueous electrolyte solution secondary battery of the present invention, while FIGS. 2 and 3 illustrate an example of the cylindrical battery respectively.

In the coin-shaped nonaqueous electrolyte solution secondary battery 10 shown in FIG. 1, reference numeral 1 is a positive electrode which can release lithium ions, reference numeral 1a is a positive electrode collector, reference numeral 2 is a negative electrode formed of a carbonaceous material that can occlude and release the lithium ions released from the positive electrode, reference numeral 2a is a negative electrode collector, reference numeral 3 is the nonaqueous electrolyte solution for batteries of the present invention, reference numeral 4 is a stainless steel-made positive electrode case, reference numeral 5 is a stainless steel-made negative electrode case, reference numeral 6 is a polypropylene-made gasket, and reference numeral 7 is a polyethylene-made separator.

In the cylindrical nonaqueous electrolyte secondary battery 10' shown in FIGS. 2 and 3, reference numeral 11 is a negative electrode, reference numeral 12 is a negative electrode collector, reference numeral 13 is a positive electrode, reference numeral 14 is a positive electrode collector, reference numeral 15 is the nonaqueous electrolyte solution for batteries of the present invention, reference numeral 16 is a separator, reference numeral 17 is a positive terminal, reference numeral 18 is a negative terminal, reference numeral 19 is a negative electrode plate, reference numeral 20 is a negative electrode lead, reference numeral 21 is a positive electrode plate, reference numeral 22 is a positive electrode lead, reference numeral 23 is a case, reference numeral 24 is an insulating plate, reference numeral 25 is a gasket, reference numeral 26 is a safety valve, and reference numeral 27 is a PTC element.

EXAMPLES

Hereinafter, the present invention will be specifically described with examples. However, the scope of the invention is not limited to the examples. Note that in the following examples, "part" and "%" are mass standard unless otherwise designated.

[Synthetic Example 1] Synthesis of Compound A1

24.7 g of 2-propynol (also referred to as propargyl alcohol), 48.6 g of triethylamine, and 210 g of ethyl acetate were prepared in a 1000 ml three-necked flask with a reflux condenser, and 32.7 g of ethyl phosphoric dichloride was dropped through a dropping funnel while being water-cooled under a nitrogen atmosphere. After dropping, the prepared product was reacted for 1 hour at room temperature, and then the reaction was completed. After the reaction, the reaction solution was well washed with water and purified by vacuum distillation, whereby 27.7 g of compound A1 [ethylbis(2-propynyl)phosphate] was obtained (yield: 68%). For the compound A1, $R^2$ and $R^1$ each represents a hydrogen atom, $R^3$ represents an ethyl compound in the general formula (1).

[Synthetic Example 2] Synthesis of Compound A2

7.0 g of 2-propynol, 72.9 g of triethylamine, and 210 g of ethyl acetate were prepared in a 1000 ml three-necked flask with a reflux condenser, and 30.8 g of phosphorus oxychloride was dropped through a dropping funnel while being ice-cooled under a nitrogen atmosphere. After dropping, the prepared product was reacted for 1 hour at room temperature, and then the reaction was completed. After the reaction, the reaction solution was well washed with water and purified by vacuum distillation, whereby 28.2 g of compound A2 [tris(2-propynyl)phosphate] was obtained (yield: 66%). For the compound A2, $R^2$ and $R^1$ each represents a hydrogen atom, $R^3$ represents a 2-propynyl compound in the general formula (1).

[Synthetic Example 3] Synthesis of Compound A3

200 ml of ethyl acetate and 55 g of 2,4-hexadiyne-1,6-diol were prepared in a 1000 ml three-necked flask with a reflux condenser, and 100 g of pyridine was dropped through a dropping funnel under a nitrogen atmosphere. 215 g of diethyl chlorophosphate was further dropped under water cooling conditions and then reacted for 1 hour under water cooling conditions, and then the reaction temperature was increased to 65° C. to complete the reaction in two hours. After the reaction, the reaction solution was well washed with water and purified by silica column, whereby 126 g of compound A3 [2,4-hexadiyne-1,6-diol tetraethyl diphosphate] was obtained (yield: 66%). For the compound A3, in the general formula (2), $R^4$ and $R^5$ each represents a hydrogen atom, and $R^6$ represents an ethyl compound.

Example 1 to 45 and Comparative Examples 1 to 30

In examples and comparative examples, the nonaqueous electrolyte secondary batteries (lithium secondary batteries) were produced in accordance with the following production procedure.
<Production Procedure>
a. Fabrication of Positive Electrode
[Fabrication of Positive Electrode A]

90 parts by mass of $LiNi_{1/3}Co_{1/3}Mn_{1/3}O_2$ (CELL SEED NMC from Nippon Chemical Industrial Co., Ltd.) as a positive electrode active material, 5 parts by mass of acetylene black as an electroconductive material, and 5 parts by mass of polyvinylidene-fluoride (PVDF) as a binder were mixed to prepare a positive electrode material. The positive electrode material was dispersed in 140 parts by mass of N-methyl-2-pyrrolidone (NMP) to be slurried. The slurry positive electrode material was applied to both sides of an aluminum-made positive electrode collector and dried, and the collector was then pressed to form into a positive electrode plate. After that, this positive electrode plate was cut in a predetermined size, whereby a disk-shaped positive electrode A was fabricated.

[Fabrication of Positive Electrode B]

78 parts by mass of LiFePO$_4$ as a positive electrode active material, 18 parts by mass of acetylene black as an electroconductive material, and 4 parts by mass of polyvinylidene-fluoride (PVDF) as a binder were mixed to prepare a positive electrode material. The positive electrode material was dispersed in 140 parts by mass of N-methyl-2-pyrrolidone (NMP) to be slurried. The slurry positive electrode material was applied to both sides of an aluminum-made positive electrode collector and dried, and the collector was then pressed to form into a positive electrode plate. After that, this positive electrode plate was cut in a predetermined size, whereby a disk-shaped positive electrode B was fabricated.

[Fabrication of Positive Electrode C]

90 parts by mass of LiNi$_{0.8}$Co$_{0.17}$Mn$_{0.03}$O$_2$ as a positive electrode active material, 5 parts by mass of acetylene black as an electroconductive material, and 5 parts by mass of polyvinylidene-fluoride (PVDF) as a binder were mixed to prepare a positive electrode material. The positive electrode material was dispersed in 140 parts by mass of N-methyl-2-pyrrolidone (NMP) to be slurried. The slurry positive electrode material was applied to both sides of an aluminum-made positive electrode collector and dried, and the collector was then pressed to form into a positive electrode plate. After that, this positive electrode plate was cut in a predetermined size, whereby a disk-shaped positive electrode C was fabricated.

b. Production of Negative Electrode

[Production of Negative Electrode A]

97.0 parts by mass of artificial graphite as a negative electrode active material, 2.0 parts by mass of styrene-butadiene rubber as a binder, 1.0 parts by mass of carboxymethylcellulose as a thickener were mixed to prepare a negative electrode material. This negative electrode material was dispersed 120 parts by mass of water to be slurried. The slurry negative electrode material was applied to both sides of a copper-made negative electrode collector and dried, and the collector was then pressed to form into a negative electrode plate. After that, This negative electrode plate was cut in a predetermined size, whereby a disk-shaped negative electrode A was fabricated. The used carboxymethylcellulose was a sodium-neutralized product whose degree of etherification was 0.9 and in a 1% by mass aqueous solution, viscosity at 20° C. was 1600.

[Production of Negative Electrode B]

97.0 parts by mass of artificial graphite as a negative electrode active material and 3.0 parts by mass of lithium polyacrylate as a binder and a thickener were mixed to prepare a negative electrode material. This negative electrode material was dispersed 120 parts by mass of water to be slurried. The slurry negative electrode material was applied to both sides of a copper-made negative electrode collector and dried, and the collector was then pressed to form into a negative electrode plate. After that, this negative electrode plate was then cut in a predetermined size, whereby a disk-shaped negative electrode B was fabricated. The used lithium polyacrylate was lithium salt of polyacrylic acid, in which a mass average molecular weight was 100000.

c. Preparation of Nonaqueous Electrolyte Solution

[Preparation of Electrolyte Solution A]

As the (C) component, 30% by mass of ethylene carbonate, 40% by mass of ethyl methyl carbonate, 25% by mass of diethyl carbonate, and 5% by mass of propyl acetate were mixed. LiPF$_6$ as electrolyte salt of the (D) component was dissolved in this mixture at a concentration of 1 mol/L to prepare an electrolyte solution A

[Preparation of Electrolyte Solution B]

As the (C) component, a mixture of 30% by mass of ethylene carbonate, 40% by mass of ethyl methyl carbonate, and 30% by mass of diethyl carbonate were prepared. LiPF$_6$ as electrolyte salt of the (D) component was dissolved in this mixture at a concentration of 1 mol/L to prepare an electrolyte solution B.

[Preparation of Nonaqueous Electrolyte Solution]

As electrolyte solution additives, the compounds A1 to A3 as the (A) components obtained in the composition examples 1 to 3, the following compounds B1 to B11 as the (B) components, compounds E1 to E2 as the (E) components, and comparative phosphate ester compounds A'1 to A'4 were dissolved in the electrolyte solution A or B, and a nonaqueous electrolyte solution for batteries was prepared. [Table 1] and [Table 2] illustrate an electrolyte solution, an electrolyte solution additive dissolved in the electrolyte solution in a lithium ion secondary battery to be described later, and a combination of a positive electrode and a negative electrode, and figures in parentheses in the tables represent a concentration (% by mass) in the nonaqueous electrolyte solution.

In the preparation of the nonaqueous electrolyte solution, the electrolyte solution additives other than the compound A1 to A3 are as follows.

[Compound B1]
ethylenesulfinate
[Compound B2]
propanesultone
[Compound B3]
ethylene methane disulfonate
[Compound B4]
bis(trifluoromethansulfonyl)imide lithium
[Compound B5]
n-butyl fluorodimethyl silane
[Compound B6]
1,2-bis(fluorodimethylsilyl)ethane
[Compound B7]
3-ethoxypropyl dimethyl fluorosilane
[Compound B8]
acetic acid-3-(dimethyl fluorosilyl)propyl
[Compound B9]
3-(dimethyl fluorosilyl)propionic acid methyl
[Compound B10]
1,3-divinyl-1,1,3,3-tetramethyl disiloxane
[Compound B11]
1,2-divinyl-1,1,2,2-tetramethyl disilane
[Compound E1]
vinylene carbonate
[Compound E2]
fluoroethylene carbonate
[Comparative phosphate ester compound A'1]
1,6-hexane diol tetramethyl diphosphate
[Comparative phosphate ester compound A'2]
triethyl phosphate
[Comparative phosphate ester compound A'3]
tribenzyl phosphate
[Comparative phosphate ester compound A'4]
triallyl phosphate d. Assembly of Battery The disk-shaped positive electrode A or B and the disk-shaped negative electrode A or B were held in a case in such a manner that a 25-μm thick polyethylene-made microporous film was sandwiched therebetween. After that, the nonaqueous electrolyte solution for batteries was put into the case, and the case was tightly closed and sealed to produce a coin-shaped lithium secondary battery with ⌀20 mm and a thickness of 3.2 mm.

TABLE 1

| | electrolyte solution additives | | | electrolyte solution | positive electrode | negative electrode |
|---|---|---|---|---|---|---|
| Example 1 | A1 (0.7) | B1 (0.4) | — | A | A | A |
| Example 2 | A1 (0.7) | B1 (0.2), B6 (0.2) | — | A | A | A |
| Example 3 | A1 (0.7) | B3 (0.4) | — | A | A | A |
| Example 4 | A1 (0.7) | B1 (0.2), B6 (0.2) | — | A | A | A |
| Example 5 | A1 (0.7) | B3 (0.4) | — | A | A | A |
| Example 6 | A1 (0.7) | B1 (0.2), B6 (0.2) | — | A | A | A |
| Example 7 | A1 (0.7) | B4 (0.4) | — | A | A | A |
| Example 8 | A1 (0.7) | B5 (0.4) | — | A | A | A |
| Example 9 | A1 (0.7) | B6 (0.4) | — | A | A | A |
| Example 10 | A1 (0.7) | B6 (0.4) | E1 (0.5) | A | A | A |
| Example 11 | A1 (0.7) | B6 (0.4) | E2 (5.0) | A | A | A |
| Example 12 | A1 (0.2), A3 (0.5) | B6 (0.4) | — | A | A | A |
| Example 13 | A1 (0.7) | B6 (0.4) | — | A | A | B |
| Example 14 | A1 (0.7) | B6 (0.4) | — | B | A | A |
| Example 15 | A1 (0.7) | B6 (0.4) | — | B | B | A |
| Example 16 | A1 (0.7) | B7 (0.4) | — | A | A | A |
| Example 17 | A1 (0.7) | B8 (0.4) | — | A | A | A |
| Example 18 | A1 (0.7) | B9 (0.4) | — | A | A | A |
| Example 19 | A1 (0.7) | B10 (0.4) | — | A | A | A |
| Example 20 | A1 (0.7) | B11 (0.4) | — | A | A | A |
| Example 21 | A2 (0.7) | B1 (0.4) | — | A | A | A |
| Example 22 | A2 (0.7) | B2 (0.4) | — | A | A | A |
| Example 23 | A2 (0.7) | B1 (0.2), B6 (0.2) | — | A | A | A |
| Example 24 | A2 (0.7) | B3 (0.4) | — | A | A | A |
| Example 25 | A2 (0.7) | B4 (0.4) | — | A | A | A |
| Example 26 | A2 (0.7) | B5 (0.4) | — | A | A | A |
| Example 27 | A2 (0.7) | B6 (0.4) | — | A | A | A |
| Example 28 | A2 (0.7) | B6 (0.4) | E1 (0.5) | A | A | A |
| Example 29 | A2 (0.7) | B6 (0.4) | E2 (5.0) | A | A | A |
| Example 30 | A2 (0.2), A3 (0.5) | B6 (0.4) | — | A | A | A |
| Example 31 | A2 (0.7) | B10 (0.4) | — | A | A | A |
| Example 32 | A2 (0.7) | B11 (0.4) | — | A | A | A |
| Example 33 | A2 (0.7) | B6 (0.4) | — | A | A | B |
| Example 34 | A2 (0.7) | B6 (0.4) | — | B | A | A |
| Example 35 | A2 (0.7) | B6 (0.4) | — | B | B | A |
| Example 36 | A3 (0.7) | B2 (0.4) | — | A | A | A |
| Example 37 | A3 (0.7) | B4 (0.4) | — | A | A | A |
| Example 38 | A3 (0.7) | B6 (0.4) | — | A | A | A |
| Example 39 | A3 (0.7) | B6 (0.4) | E1 (0.5) | A | A | A |
| Example 40 | A3 (0.7) | B6 (0.4) | E2 (5.0) | A | A | A |
| Example 41 | A3 (0.7) | B6 (0.4) | — | A | A | B |
| Example 42 | A3 (0.7) | B6 (0.4) | — | B | A | A |
| Example 43 | A3 (0.7) | B6 (0.4) | — | B | B | A |
| Example 44 | A2 (0.7) | B2 (0.4) | — | B | C | A |
| Example 45 | A2 (0.7) | B6 (0.4) | — | B | C | A |

TABLE 2

| | electrolyte solution additives | | | electrolyte solution | positive electrode | negative electrode |
|---|---|---|---|---|---|---|
| Comp. Example 1 | — | — | — | A | A | A |
| Comp. Example 2 | A1 (0.7) | — | — | A | A | A |
| Comp. Example 3 | A2 (0.7) | — | — | A | A | A |
| Comp. Example 4 | A3 (0.7) | — | — | A | A | A |
| Comp. Example 5 | — | B1 (0.4) | — | A | A | A |
| Comp. Example 6 | — | B2 (0.4) | — | A | A | A |
| Comp. Example 7 | — | B3 (0.4) | — | A | A | A |
| Comp. Example 8 | — | B4 (0.4) | — | A | A | A |
| Comp. Example 9 | — | B5 (0.4) | — | A | A | A |
| Comp. Example 10 | — | B6 (0.4) | — | A | A | A |
| Comp. Example 11 | — | B6 (0.4) | E1 (0.5) | A | A | A |
| Comp. Example 12 | — | B6 (0.4) | E2 (5.0) | A | A | A |
| Comp. Example 13 | — | B7 (0.4) | — | A | A | A |
| Comp. Example 14 | — | B8 (0.4) | — | A | A | A |
| Comp. Example 15 | — | B9 (0.4) | — | A | A | A |
| Comp. Example 16 | — | B10 (0.4) | — | A | A | A |
| Comp. Example 17 | — | B11 (0.4) | — | A | A | A |
| Comp. Example 18 | — | — | E1 (0.5) | A | A | A |
| Comp. Example 19 | — | — | E2 (5.0) | A | A | A |
| Comp. Example 20 | A'1 (0.7) | B6 (0.4) | — | A | A | A |
| Comp. Example 21 | A'1 (0.7) | B6 (0.4) | — | B | A | A |
| Comp. Example 22 | A'2 (0.7) | B6 (0.4) | — | A | A | A |
| Comp. Example 23 | A'2 (0.7) | B6 (0.4) | — | A | B | A |

TABLE 2-continued

|  | electrolyte solution additives | | | electrolyte solution | positive electrode | negative electrode |
|---|---|---|---|---|---|---|
| Comp. Example 24 | A'3 (0.7) | B6 (0.4) | — | A | A | A |
| Comp. Example 25 | A'3 (0.7) | B6 (0.4) | — | A | A | B |
| Comp. Example 26 | A'4 (0.7) | B6 (0.4) | — | A | A | A |
| Comp. Example 27 | A'4 (0.7) | B6 (0.4) | — | B | B | A |
| Comp. Example 28 | — | — | — | B | B | A |
| Comp. Example 29 | — | — | — | B | C | A |
| Comp. Example 30 | — | — | E1 (1.0) | B | C | A |

By virtue of the use of lithium secondary batteries containing the nonaqueous electrolyte solutions of examples 1 to 45 or comparative examples 1 to 30, an initial characterization test and a cycling characterization test were performed by the following test method. In the initial characterization test, the discharge capacity ratio (%) and internal resistance ratio (%) were obtained. In the cycling characterization test, the discharge capacity maintenance rate (%) and the internal resistance increasing rate (%) were obtained. The test results are shown in the following [Table 3] and [Table 4].

<Initial Characterization Test Method in Positive Electrode A> a. Method of Measuring Discharge Capacity Ratio

A lithium secondary battery was placed in a constant-temperature oven at 20° C. and charged to 4.3 V in a constant-current/constant-voltage mode with a charge current of 0.3 mA/cm$^2$ (current value corresponding to 0.2 C) and discharged to 3.0 V in the constant-current mode with a discharge current of 0.3 mA/cm$^2$ (current value corresponding to 0.2 C), and this operation was performed five times. After that, the lithium secondary battery was charged to 4.3 V in the constant-current/constant-voltage mode with a charge current of 0.3 mA/cm$^2$ and discharged to 3.0 V in the constant-current mode with a discharge current of 0.3 mA/cm$^2$. The discharge capacity measured in the sixth operation was determined as the initial discharge capacity of the battery, and as shown in the following formula, the discharge capacity ratio (%) was obtained as a ratio of the initial discharge capacity measured when the initial discharge capacity of the example 1 was 100.

Discharge capacity ratio (%)=[(initial discharge capacity)/(initial discharge capacity in example 1)]×100 b. Method of Measuring Internal Resistance Ratio

For the lithium secondary battery after the measurement of the discharge capacity in the sixth operation, the lithium secondary battery was charged to 3.75 V in a constant-current/constant-voltage mode with a charge current of 1.5 mA/cm$^2$ (current value corresponding to 1 C), and scanning was performed up to a frequency of 100 kHz to 0.02 Hz, using an alternating-current impedance measurement apparatus (manufactured by IVIUM TECHNOLOGIES, Mobile potentiostat CompactStat) to create a Cole-Cole plot, where the vertical axis represented the imaginary part and the horizontal axis represented the real part. Subsequently, in this Cole-Cole plot, the arc region was fit to a circle, and of the two points where the circle crossed with the real part, the larger value was obtained as the initial internal resistance of the battery, and, as shown in the following formula, the internal resistance ratio (%) was obtained as the rate of the initial internal resistance measured when the initial internal resistance of the example 1 was 100.

Internal resistance ratio (%)=[(initial internal resistance)/(initial internal resistance in example 1)]×100

<Initial Characterization Test Method in Positive Electrode B>

A lithium secondary battery was placed in a constant-temperature oven at 20° C. and charged to 4.0 V in a constant-current/constant-voltage mode with a charge current of 0.3 mA/cm$^2$ (current value corresponding to 0.2 C) and discharged to 2.0 V in the constant-current mode with a discharge current of 0.3 mA/cm$^2$ (current value corresponding to 0.2 C), and this operation was performed five times. After that, the lithium secondary battery was charged to 4.0 V in the constant-current/constant-voltage mode with a charge current of 0.3 mA/cm$^2$ and discharged to 2.0 V in the constant-current mode with a discharge current of 0.3 mA/cm$^2$. The discharge capacity measured in the sixth operation was determined as the initial discharge capacity of the battery, and the discharge capacity ratio (%) was obtained in a similar manner to the initial characterization test method in the positive electrode A. For the lithium secondary battery after the measurement of the discharge capacity in the sixth operation, the internal resistance ratio (%) was obtained in a similar manner to the initial characterization test method in the positive electrode A.

<Initial Characterization Test Method in Positive Electrode C>

A lithium secondary battery was placed in a constant-temperature oven at 20° C. and charged to 4.2 V in a constant-current/constant-voltage mode with a charge current of 0.3 mA/cm$^2$ (current value corresponding to 0.2 C) and discharged to 3.0 V in the constant-current mode with a discharge current of 0.3 mA/cm$^2$ (current value corresponding to 0.2 C), and this operation was performed five times. After that, the lithium secondary battery was charged to 4.2 V in the constant-current/constant-voltage mode with a charge current of 0.3 mA/cm$^2$ and discharged to 3.0 V in the constant-current mode with a discharge current of 0.3 mA/cm$^2$. The discharge capacity measured in the sixth operation was determined as the initial discharge capacity of the battery, and the discharge capacity ratio (%) was obtained in a similar manner to the initial characterization test method in the positive electrode A. For the lithium secondary battery after the measurement of the discharge capacity in the sixth operation, the internal resistance ratio (%) was obtained in a similar manner to the initial characterization test method in the positive electrode A.

<Cycling Characterization Test Method in Positive Electrode A> a. Method of Measuring Discharge Capacity Maintenance Rate

The lithium secondary battery after the initial characterization test was placed in a constant-temperature oven at 65° C. and charged to 4.3 V in a constant-current mode with a charge current of 1.5 mA/cm$^2$ (current value corresponding to 1 C, and 1 C is a current value for discharging the capacity of the battery in 1 hour) and discharged to 3.0 V in the constant-current mode with a discharge current of 1.5 mA/cm$^2$, and this cycle was repeated 200 times. The discharge capacity measured in the 200th cycle was determined as the discharge capacity after the cycling test, and, as shown in the following formula, the discharge capacity maintenance rate (%) was obtained as a rate of the discharge capacity after the cycling test performed when the initial discharge capacity of each battery was 100.

Discharge capacity maintenance rate (%)=[(discharge capacity after cycling test)/(initial discharge capacity)]×100 b. Method of Measuring Internal Resistance Increasing Rate

After the cycling test, the atmosphere temperature was returned to 20° C., the internal resistance at 20° C. was measured in a similar manner to the method of measuring the internal resistance ratio, and the internal resistance at this time was determined as the internal resistance after the cycling test. As shown in the following formula, the internal resistance increasing rate (%) was obtained as the rate of the increase of internal resistance after the cycling test performed when the initial internal resistance of each battery was 100.

Internal resistance increasing rate (%)=[(internal resistance after cycling test−initial internal resistance)/(initial internal resistance)]×100

<Cycling Characterization Test Method in Positive Electrode B>

The lithium secondary battery after the initial characterization test was placed in a constant-temperature oven at 65° C. and charged to 4.0 V in a constant-current mode with a charge current of 1.5 mA/cm$^2$ (current value corresponding to 1 C, and 1 C is a current value for discharging the capacity of the battery in 1 hour) and discharged to 2.0 V in the constant-current mode with a discharge current of 1.5 mA/cm$^2$, and this cycle was repeated 200 times. The discharge capacity measured in the 200th cycle was determined as the discharge capacity after the cycling test, and the discharge capacity maintenance rate (%) was obtained in a similar manner to the cycling characterization test method in the positive electrode A. For the lithium secondary battery after the cycling test, the internal resistance increasing rate (%) was obtained in a similar manner to the cycling characterization test method in the positive electrode A.

<Cycling Characterization Test Method in Positive Electrode C>

The lithium secondary battery after the initial characterization test was placed in a constant-temperature oven at 65° C. and charged to 4.2 V in a constant-current mode with a charge current of 1.5 mA/cm$^2$ (current value corresponding to 1 C, and 1 C is a current value for discharging the capacity of the battery in 1 hour) and discharged to 3.0 V in the constant-current mode with a discharge current of 1.5 mA/cm$^2$, and this cycle was repeated 200 times. The discharge capacity measured in the 200th cycle was determined as the discharge capacity after the cycling test, and the discharge capacity maintenance rate (%) was obtained in a similar manner to the cycling characterization test method in the positive electrode A. For the lithium secondary battery after the cycling test, the internal resistance increasing rate (%) was obtained in a similar manner to the cycling characterization test method in the positive electrode A.

TABLE 3

| | Initial characterization | | Cycling characterization | |
|---|---|---|---|---|
| | discharge capacity ratio | Internal resistance ratio | discharge capacity maintenance rate | internal resistance increasing rate |
| Example 1 | 100 | 100 | 81 | 25 |
| Example 2 | 103 | 98 | 82 | 24 |
| Example 3 | 105 | 97 | 83 | 24 |
| Example 4 | 104 | 98 | 84 | 23 |
| Example 5 | 106 | 97 | 84 | 23 |
| Example 6 | 105 | 96 | 85 | 22 |
| Example 7 | 106 | 96 | 84 | 23 |
| Example 8 | 110 | 92 | 84 | 22 |
| Example 9 | 113 | 90 | 85 | 22 |
| Example 10 | 112 | 91 | 86 | 21 |
| Example 11 | 111 | 92 | 85 | 21 |
| Example 12 | 113 | 90 | 86 | 21 |
| Example 13 | 114 | 88 | 86 | 22 |
| Example 14 | 112 | 91 | 86 | 23 |
| Example 15 | 111 | 90 | 80 | 41 |
| Example 16 | 112 | 89 | 84 | 25 |
| Example 17 | 111 | 88 | 83 | 26 |
| Example 18 | 113 | 91 | 84 | 24 |
| Example 19 | 112 | 90 | 83 | 22 |
| Example 20 | 113 | 89 | 83 | 24 |
| Example 21 | 98 | 102 | 80 | 26 |
| Example 22 | 103 | 99 | 81 | 23 |
| Example 23 | 102 | 98 | 84 | 22 |
| Example 24 | 103 | 99 | 82 | 25 |
| Example 25 | 103 | 98 | 82 | 22 |
| Example 26 | 107 | 94 | 83 | 24 |
| Example 27 | 110 | 92 | 83 | 23 |
| Example 28 | 110 | 93 | 85 | 22 |
| Example 29 | 109 | 94 | 84 | 22 |
| Example 30 | 108 | 93 | 85 | 21 |
| Example 31 | 109 | 92 | 84 | 23 |
| Example 32 | 110 | 91 | 82 | 25 |
| Example 33 | 111 | 90 | 87 | 22 |
| Example 34 | 109 | 93 | 84 | 24 |
| Example 35 | 108 | 92 | 79 | 40 |
| Example 36 | 97 | 104 | 78 | 25 |
| Example 37 | 101 | 102 | 79 | 26 |
| Example 38 | 100 | 102 | 77 | 27 |
| Example 39 | 108 | 101 | 79 | 25 |
| Example 40 | 107 | 103 | 80 | 23 |
| Example 41 | 109 | 92 | 84 | 24 |
| Example 42 | 99 | 103 | 78 | 28 |
| Example 43 | 99 | 102 | 75 | 41 |
| Example 44 | 98 | 102 | 81 | 32 |
| Example 45 | 100 | 98 | 86 | 26 |

TABLE 4

| | Initial characterization | | Cycling characterization | |
|---|---|---|---|---|
| | discharge capacity ratio | Internal resistance ratio | discharge capacity maintenance rate | internal resistance increasing rate |
| Comp. Example 1 | 99 | 110 | 35 | 189 |
| Comp. Example 2 | 101 | 103 | 68 | 115 |
| Comp. Example 3 | 104 | 104 | 71 | 107 |
| Comp. Example 4 | 100 | 107 | 51 | 156 |
| Comp. Example 5 | 104 | 98 | 44 | 231 |
| Comp. Example 6 | 98 | 121 | 33 | 225 |

TABLE 4-continued

| | Initial characterization | | Cycling characterization | |
|---|---|---|---|---|
| | discharge capacity ratio | Internal resistance ratio | discharge capacity maintenance rate | internal resistance increasing rate |
| Comp. Example 7 | 86 | 138 | 34 | 200 |
| Comp. Example 8 | 88 | 137 | 33 | 185 |
| Comp. Example 9 | 85 | 107 | 35 | 165 |
| Comp. Example 10 | 87 | 112 | 34 | 170 |
| Comp. Example 11 | 88 | 116 | 57 | 75 |
| Comp. Example 12 | 89 | 115 | 42 | 88 |
| Comp. Example 13 | 91 | 125 | 32 | 183 |
| Comp. Example 14 | 86 | 120 | 33 | 194 |
| Comp. Example 15 | 87 | 132 | 34 | 189 |
| Comp. Example 16 | 87 | 106 | 33 | 154 |
| Comp. Example 17 | 98 | 121 | 33 | 225 |
| Comp. Example 18 | 100 | 102 | 58 | 168 |
| Comp. Example 19 | 96 | 103 | 42 | 168 |
| Comp. Example 20 | 87 | 105 | 35 | 171 |
| Comp. Example 21 | 88 | 106 | 38 | 175 |
| Comp. Example 22 | 97 | 106 | 35 | 194 |
| Comp. Example 23 | 98 | 115 | 36 | 201 |
| Comp. Example 24 | 97 | 107 | 30 | 176 |
| Comp. Example 25 | 95 | 105 | 31 | 177 |
| Comp. Example 26 | 95 | 109 | 23 | 177 |
| Comp. Example 27 | 94 | 105 | 25 | 184 |
| Comp. Example 28 | 97 | 131 | 26 | 204 |
| Comp. Example 29 | 100 | 100 | 48 | 146 |
| Comp. Example 30 | 100 | 100 | 70 | 80 |

As seen from the results of [Table 3] and [Table 4], in the nonaqueous electrolyte secondary battery of the present invention, a nonaqueous electrolyte solution contains (A) at least one compound selected from a group consisting of the unsaturated phosphate ester compound represented by the general formula (1) or (2) and (B) at least one compound selected from a group consisting of a sulfite ester compound, a alkyl sulfate ester compound, an alkali metal imide salt compound, a fluorosilane compound, and an organic disilane compound or an organic disiloxane compound. The nonaqueous electrolyte secondary battery is excellent in the internal resistance and the discharge capacity after the cycling test at 65° C., and it can be considered that excellent battery characteristics can be maintained.

INDUSTRIAL APPLICABILITY

In the nonaqueous electrolyte secondary battery of the present invention, a small internal resistance and a high discharge capacity can be maintained even when used for a long period of time and used under a condition that temperature significantly changes. The nonaqueous electrolyte secondary battery can be applied to various uses such as a video camera, a digital camera, a portable music player, a sound recorder, a portable DVD player, a portable game machine, a notebook computer, an electronic dictionary, an electronic notebook, an electronic book, a portable telephone, a portable TV, an electric assist bicycle, a battery car, and a hybrid car and particularly, can be suitably applied to uses such as a battery car and a hybrid car which are sometimes used in high-temperature states.

REFERENCE SIGNS LIST

1 Positive electrode
1a Positive electrode collector
2 Negative electrode
2a Negative electrode collector
3 Electrolyte solution
4 Positive electrode case
5 Negative electrode case
6 Gasket
7 Separator
10 Coin-shaped nonaqueous electrolyte secondary battery
10' Cylindrical nonaqueous electrolyte secondary battery
11 Negative electrode
12 Negative electrode collector
13 Positive electrode
14 Positive electrode collector
15 Electrolyte solution
16 Separator
17 Positive electrode terminal
18 Negative electrode terminal
19 Negative electrode plate
20 Negative electrode lead
21 Positive electrode
22 Positive electrode lead
23 Case
24 Insulating plate
25 Gasket
26 Safety valve
27 PTC element

The invention claimed is:

1. A nonaqueous electrolyte secondary battery, comprising:
  a negative electrode;
  a positive electrode; and
  a nonaqueous electrolyte solution for batteries,
  wherein the negative electrode contains a polymeric carboxylic compound,
  wherein the nonaqueous electrolyte solution for batteries comprises:
    an unsaturated phosphate ester compound represented by the following general formula (2) as an (A) component,
    at least one compound as a (B) component selected from the group consisting of a sulfonate ester compound and an alkali metal imide salt compound,
    an organic solvent as a (C) component, and
    electrolyte salt as a (D) component,

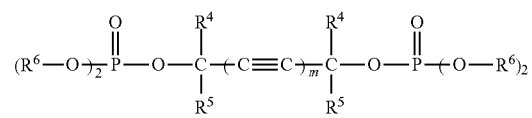

(2)

wherein $R^4$ and $R^5$ each independently represents a hydrogen atom or an alkyl group having a carbon number of 1 to 8, $R^6$ represents an alkyl group having a carbon number of 1 to 8, an alkenyl group having a carbon number of 2 to 8, an alkynyl group having a carbon number of 2 to 8, or a halo alkyl group having a carbon number of 1 to 8, and m represents 1 or 2.

2. The nonaqueous electrolyte secondary battery according to claim 1, wherein the (B) component is at least one compound selected from the group consisting of a cyclic monosulfonate ester compound, a cyclic disulfonate ester compound, and a lithium imide salt compound.

3. The nonaqueous electrolyte secondary battery according to claim 1, wherein the (C) component is a mixture of one or more organic solvent selected from a group consisting of a saturated cyclic carbonate compound, a saturated cyclic ester compound, a sulfone or sulfoxide compound, and an amide compound with one or more organic solvents selected from a group consisting of a saturated chain carbonate compound, a chain ether compound, a cyclic ether compound, and a saturated chain ester compound.

4. The nonaqueous electrolyte secondary battery according to claim 3, wherein the (C) component is an organic solvent containing 0.5 to 30% by mass of the saturated chain ester compound.

5. The nonaqueous electrolyte secondary battery according to claim 1, further comprising, as an (E) component, at least one carbonate compound selected from a group consisting of an unsaturated cyclic carbonate compound, an unsaturated chain carbonate compound, an unsaturated diester compound, and a halogen-containing cyclic carbonate compound.

6. The nonaqueous electrolyte secondary battery according to claim 1, wherein the positive electrode is a positive electrode containing a nickel compound or an iron compound as a positive electrode active material.

7. The nonaqueous electrolyte secondary battery according to claim 2, wherein the (C) component is a mixture of one or more organic solvent selected from a group consisting of a saturated cyclic carbonate compound, a saturated cyclic ester compound, a sulfone or sulfoxide compound, and an amide compound with one or more organic solvents selected from a group consisting of a saturated chain carbonate compound, a chain ether compound, a cyclic ether compound, and a saturated chain ester compound.

8. The nonaqueous electrolyte secondary battery according to claim 7, wherein the (C) component is an organic solvent containing 0.5 to 30% by mass of the saturated chain ester compound.

9. The nonaqueous electrolyte secondary battery according to claim 2, further comprising, as an (E) component, at least one carbonate compound selected from a group consisting of an unsaturated cyclic carbonate compound, an unsaturated chain carbonate compound, an unsaturated diester compound, and a halogen-containing cyclic carbonate compound.

10. The nonaqueous electrolyte secondary battery according to claim 2, wherein the positive electrode is a positive electrode containing a nickel compound or an iron compound as a positive electrode active material.

11. The nonaqueous electrolyte secondary battery according to claim 1, wherein a total amount of (B) component is present at 0.01 to 5% by mass in the nonaqueous electrolyte solution.

12. The nonaqueous electrolyte secondary battery according to claim 1, wherein a total amount of (B) component is present at 0.03 to 4% by mass in the nonaqueous electrolyte solution.

13. The nonaqueous electrolyte secondary battery according to claim 1, wherein a total amount of (B) component is present at 0.05 to 3% by mass in the nonaqueous electrolyte solution.

* * * * *